(12) United States Patent
Miyamoto et al.

(10) Patent No.: US 7,688,279 B2
(45) Date of Patent: Mar. 30, 2010

(54) FRACTAL STRUCTURE, SUPER STRUCTURE OF FRACTAL STRUCTURES, METHOD FOR MANUFACTURING THE SAME AND APPLICATIONS

(75) Inventors: Yoshinari Miyamoto, Osaka (JP); Soshu Kirihara, Osaka (JP); Atsutaka Mori, Osaka (JP); Mitsuo Takeda, Nagano (JP); Katsuya Honda, Nagano (JP); Kazuaki Sakoda, Ibaraki (JP)

(73) Assignees: Juridical Foundation Osaka Industrial Promotion Organization, Osaka (JP); Independent Administrative Institution National Institute for Materials Science, Ibaraki (JP)

( * ) Notice: Subject to any disclaimer, the term of this patent is extended or adjusted under 35 U.S.C. 154(b) by 557 days.

(21) Appl. No.: 10/570,894

(22) PCT Filed: Sep. 7, 2004

(86) PCT No.: PCT/JP2004/012983
§ 371 (c)(1),
(2), (4) Date: Aug. 23, 2006

(87) PCT Pub. No.: WO2005/027611
PCT Pub. Date: Mar. 24, 2005

(65) Prior Publication Data
US 2007/0067058 A1    Mar. 22, 2007

(30) Foreign Application Priority Data

| Sep. 8, 2003 | (JP) | ............................... 2003-315768 |
| Jan. 20, 2004 | (JP) | ............................... 2004-012292 |
| Jun. 17, 2004 | (JP) | ............................... 2004-180230 |

(51) Int. Cl.
*H01Q 15/02* (2006.01)
(52) U.S. Cl. ..................................... 343/909
(58) Field of Classification Search ................. 343/909, 343/700 MS
See application file for complete search history.

(56) References Cited

U.S. PATENT DOCUMENTS 5,355,318 A * 10/1994 Dionnet et al. ............... 700/120

(Continued)

FOREIGN PATENT DOCUMENTS

WO          93/24897          12/1993

(Continued)

OTHER PUBLICATIONS

M. W. Takeda et al., "Localization of Electromagnetic Waves in Three-Dimensional Fractal Cavities", Physical Review Letters, Mar. 5, 2004, vol. 92, No. 9, pp. 093902.1 to 093902.4.

(Continued)

*Primary Examiner*—Hoang V Nguyen
*Assistant Examiner*—Robert Karacsony
(74) *Attorney, Agent, or Firm*—Wenderoth, Lind & Ponack, L.L.P.

(57) ABSTRACT

A three-dimensional fractal-structure body partially or entirely comprises a three-dimensional fractal structure, the fractal structure body having a local minimum value at a particular wavelength determined by structural and material factors of the fractal structure in a transmissivity for electromagnetic waves and/or a local minimum value at a particular wavelength determined by structural and material factors of the fractal structure in the reflectivity for electromagnetic waves.

25 Claims, 16 Drawing Sheets

U.S. PATENT DOCUMENTS

2002/0140615 A1    10/2002    Carles et al.
2003/0080921 A1*    5/2003    Wen et al. .................. 343/909

FOREIGN PATENT DOCUMENTS

| WO | 99/25044 | 5/1999 |
| WO | 01/22528 | 3/2001 |
| WO | 02/23671 | 3/2002 |

OTHER PUBLICATIONS

T. Mori et al., "Ceramic/Kobunshikei Photonic Fractal ni yoru Denjiha Kyokkuzai", Dai 42 Kai Ceramics Kiso Kagaku Toronkai Koen Yoshishu, Jan. 22, 2004, pp. 206 and 207—partial translation.

A. Kirihara et al., "Hikari Zokeiho ni yoru Ceramic/Kobunshikei Photonic Fractal no Sakusei", Dai 42 Kai Ceramics Kiso Kagaku Toronkai Koen Yoshishu, Jan. 22, 2004 pp. 204 and 205—partial translation.

S. Kirihara et al., "Localization Effect of Electromagnetic Waves in the Photonic Fractal, and Its Applications", Electro Magnetic Compatibility EMC, Aug. 5, 2004, No. 196, pp. 17 to 26 w/translation.

Y. Miyamoto et al., "Smart Processing Development of photonic Crystals and Fractals", International Journal of Applied Ceramic Technology, vol. 1, No. 1, 2004, pp. 40-48.

* cited by examiner

Azimuth (deg)

Menger sponge antenna head

Monopole antenna

FRACTAL STRUCTURE, SUPER STRUCTURE OF FRACTAL STRUCTURES, METHOD FOR MANUFACTURING THE SAME AND APPLICATIONS

BACKGROUND OF THE INVENTION

1. Technical Field

The present invention relates to a fractal structure that controls electromagnetic waves of wavelengths ranging from visible light to microwaves, particularly to localize and confine electromagnetic waves of a particular wavelength in the fractal structure as well as absorbing without reflection, storing, amplifying and filtering the electromagnetic waves, a method for manufacturing the same and applications thereof.

2. Background Art

Since the 1990s, vigorous efforts have been made in theoretical research into the reflection and transmission of electromagnetic waves by fractal structures characterized by so-called self-similarity, which means that any part of the structure is similar to the entire structure. There has been the remarkable discovery that reflection coefficients become higher in a particular direction, or change significantly in a periodic manner, with the wall thickness of the fractal structure or with the frequency [Non-Patent Documents 1, 2]. However, theoretical calculations have been limited mostly to simple structures such as the Cantor set having a fractal dimension, which represents the complexity of a fractal structure, of 0.6309. Experimental researches, on the other hand, are few and are directed toward two-dimensional fractal structures [Non-Patent Document 3], and have not been made for three-dimensional fractal structures due to the difficulty of fabricating complicated fractal structures.

To control electromagnetic waves of wavelengths ranging from visible light to microwave regions, advanced technologies have been employed according to the associated wavelength region. In recent years, research and development efforts have been focused on dielectric materials called photonic crystals in which periodic structures totally reflect electromagnetic waves, and that may find various applications including integrated optical circuits, high efficiency laser oscillation, and frequency adjustable filters.

Non-Patent Document 1: W. Wen, L. Zhou, J. Li, W. Ge, C. T. Chen, & P. Sheng; Phys. Rev. Lett. 89, 223901 (2002)

Non-Patent Document 2: V. N. Bolotov, Technical Physics; 45, 1604 (2000)

Non-Patent Document 3: X. Sun and D L. Jaggard; Applied Phys., 70, 2500 (1991)

BRIEF SUMMARY OF THE INVENTION

For the purpose of providing a three-dimensional fractal-structure body that had not been realized by the prior art and newly developed technologies, and utilizing various characteristics of a three-dimensional fractal-structure body with respect to electromagnetic waves of a particular wavelength, the present inventors conducted research that resulted in a finding that a particular fractal-structure body shows a selective response to electromagnetic waves of a particular wavelength with a dip in the transmission spectrum and reflection spectrum at the particular wavelength that is determined by the fractal-structure body. The fractal-structure body has the capability to confine (localize) electromagnetic waves of the particular wavelength substantially completely within a region, thereby completing the present invention.

A first fractal-structure body of the present invention is a body that partially or entirely comprises a three-dimensional fractal structure, characterized by a transmissivity for electromagnetic waves that decreases to a local minimum value at a particular wavelength determined by structural and material factors of the fractal structure and/or reflectivity for electromagnetic waves that decreases to a local minimum value at a particular wavelength determined by structural and material factors of the fractal structure. These local minimum values may occur at different wavelengths.

In this specification, electromagnetic wave refers to a disturbance in an electric field and a magnetic field propagating through a medium while varying with time, and includes γ rays, X rays, ultraviolet rays, visible light, infrared rays and radio waves (including tera-Hertz waves, millimeter waves, microwave, ultra-short waves, short waves, medium waves and long waves).

The structural factors refer to the factors that make a part of the fractal structure similar to the whole structure, such as the elements that define the shape of the whole (for example the length of an edge 'a') and a factor that defines the reduction ratio of a substructure to the original shape.

The material factors refer to the properties of the material that forms the fractal-structure body, which relate mainly to electrical properties such as the dielectric constant and the electrical conductivity.

The local minimum value of the transmissivity and local minimum value of the reflectivity refers to particular wavelengths at which transmissivity or reflectivity takes a local minimum value, which are not necessarily equal to the lowest value.

In the case where a fractal-structure body has a local minimum value of transmissivity and a local minimum value of reflectivity at the same wavelength, electromagnetic waves of that particular wavelength are confined and localized in the fractal-structure body.

In the case where a fractal-structure body has both a local minimum value of transmissivity and a local minimum value of reflectivity at different wavelengths, the fractal-structure body has an asymmetrical distortion.

In the first fractal-structure body, the local minimum value of transmissivity is preferably −10 dB or less, which means that virtually no transmission of electromagnetic waves occurs, and the local minimum value of reflectivity is preferably −5 dB or less, which means that virtually no reflection of electromagnetic waves occurs.

According to the present invention, the local minimum value of transmissivity is more preferably −20 dB or less, and even more preferably −30 dB or less, while the local minimum value of reflectivity is more preferably −10 dB or less, and even more preferably −15 dB or less.

When both of these local minimum values occur at the same wavelength, the first fractal-structure body is also capable of localizing electromagnetic waves of a particular wavelength, which is determined by the structure and material of the fractal within the structure.

A second fractal-structure body of the present invention is a structure constituted partially or totally from a three-dimensional fractal structure, and is capable of localizing electromagnetic waves of a particular wavelength that is determined by the structural factors which define the fractal structure and the dielectric constant and/or electric conductivity of the material that forms the structure.

In the first and second fractal-structure bodies of the present invention, the three-dimensional fractal structure is preferably formed in a configuration that has a plurality of through-holes, the through-holes penetrating through each face at a center thereof, and a plurality of primary structures each having a shape of a 1/S reduction of the entire fractal structure including the through-holes, wherein the intersection of the through-holes with a face of the structure has a shape of an n/S reduction of the face (n is an integer 1 or larger and less than S).

When the first and second fractal-structure bodies of the present invention are formed from a dielectric material, the wavelength at which the transmissivity shows a local minimum value and/or the reflectivity shows a local minimum value is given as follows:

$$2a\sqrt{\in}n/S \qquad \text{[Equation 1]}$$

where $\in$ is the mean volume dielectric constant that can be calculated from the structural factors of the fractal structure and the dielectric constant of the material that constitutes the fractal-structure body.

The first and second fractal-structure bodies of the present invention also have fractal dimension D that is a non-integral number larger than 2, and satisfies an equation $N=S^D$ (N is the number of divisions of the structure into identical elements minus the number of elements removed from the structure to form the cavities).

The first and second fractal-structure bodies of the present invention preferably have a constitution such that the fundamental structure is repeated at different scales in a nested pattern.

A representative structure of the first and second fractal-structure bodies of the present invention is a Menger sponge-type fractal structure having fractal dimension D of 2.7268.

When the first and second fractal-structure bodies of the present invention are formed from a dielectric material, the particular wavelength described above is substantially determined only according to the dielectric constant, and not the electrical conductivity. The dielectric constant can be calculated using the mean volume dielectric constant $\in$ which is determined from the structural factors of the fractal structure and dielectric constant of the material that constitutes the fractal-structure body.

A third fractal-structure body according to the present invention is constituted partially or totally from a fractal-structure body of a configuration that has a plurality of through-holes, the through-holes penetrating through each face at a center thereof, and a plurality of primary structures each having a shape of a 1/S reduction of the entire fractal-structure including the through-holes, wherein the intersection of the through-hole with a face of the structure is an n/S reduction of the face (n is an integer 1 or larger and less than S) while the fractal-structure has length 'a' along one edge thereof.

A fourth fractal-structure body according to the present invention is a wall-shaped or column-shaped super structure constituted from a plurality of Menger sponge-type fractal-structure bodies each having a cubic shape that has a plurality of through-holes, the through-holes penetrating through each face at a center thereof, and a plurality of primary structures each having a shape of a 1/S reduction of the entire fractal structure including the through-holes, wherein the intersection of the through-holes with a face of the structure is an n/S reduction of the face (n is an integer 1 or larger and less than S), while the plurality of Menger sponge-type fractal structures are connected to each other so that regions of size ⅓ to ⅑ of one edge 'a' are shared in the vertical and/or horizontal faces of the Menger sponge-type fractal structures.

The third and fourth fractal-structure bodies of the present invention are characterized by transmissivity of −20 dB or less and low reflectivity of −5 dB or less for electromagnetic waves of a particular wavelength determined as follows:

$$2^p a\sqrt{\in}n/S^{2p-1} \qquad \text{[Equation 2]}$$

where p is the order of the electromagnetic wave propagation mode, and is an integer greater than or equal to one.

A fifth fractal-structure body according to the present invention is a partial structure of the Menger sponge-type fractal-structure body that has a cubic shape that has a plurality of through-holes, the through-holes penetrating through each face at a center thereof and a plurality of primary structures each having a shape of a 1/S reduction of the entire fractal structure including the through-holes, wherein the intersection of the through-holes with a face of the structure is an n/S reduction of the face (n is an integer 1 or larger and less than S), from which a plate-shaped portion having a thickness of ⅓ to ⅑ of one edge 'a' is removed.

A sixth fractal-structure body according to the present invention is a wall-shaped or column-shaped super structure constituted by connecting a plurality of partial structures of the Menger sponge-type fractal-structure bodies, each having a cubic shape that has a through-hole penetrating through each face at a center thereof and a plurality of primary structures each having a shape of a 1/S reduction of the entire fractal-structure including the through-holes, wherein the intersection of the through-holes with a face of the structure is an n/S reduction of the face (n is an integer 1 or larger and less than S), from which a plate-shaped portion having a thickness of ⅓ to ⅑ of one edge 'a' is removed, so that regions of size ⅓ to ⅑ of one edge 'a' are shared in the vertical and horizontal faces.

A seventh fractal-structure body according to the present invention is a plate-like structure having a shape of a two-dimensional Cantor fractal pattern from which a square portion of a size reduced to n/S (n is an integer 1 or larger and less than S) of the square face measuring 'a' along one side of the fractal-structure body is removed from the square face, with the two-dimensional Cantor fractal pattern penetrating to a certain thickness in a direction perpendicular to the surface.

An eighth fractal-structure body according to the present invention is a wall-shaped or column-shaped super structure of the cavity-penetrated plate-shaped fractal structure constituted by connecting a plurality of plate-like structures, each having a shape of a two-dimensional Cantor fractal pattern from which a square portion of a size reduced to n/S (n is an integer 1 or larger and less than S) of the square face measuring 'a' along one side of the fractal structure is removed from the square face, with the two-dimensional Cantor fractal pattern penetrating to a certain thickness in a direction perpendicular to the surface, so that regions of size ⅓ to ⅑ of one edge 'a' are shared in the vertical and horizontal faces.

The fifth through eighth fractal-structure bodies of the present invention are characterized by low reflectivity of −5 dB or less for electromagnetic waves of a particular wavelength that corresponds to a value of the following formula.

$$2^p a\sqrt{\in}n/S^{2p-1} \qquad \text{[Equation 3]}$$

where $\in$ is the mean volume dielectric constant of the fractal-structure body and p is the order of the electromagnetic wave propagation mode, and is an integer greater than or equal to one.

The first through eighth fractal-structure bodies of the present invention may be formed from various materials as long as the three-dimensional shape of the fractal structure can be formed, including resins, ceramics, semiconductors, metals, or a composite material constituted from some of these materials. The inner space of the fractal-structure body may be filled with a gas, liquid or solid material that has a dielectric constant different from that of the fractal structure body, or the inner space may be a vacuum.

The first through eighth fractal-structure bodies of the present invention may be formed from a resin that includes ceramic particles of high dielectric constant and/or ceramic particles of low electromagnetic loss dispersed uniformly therein. The inner surface and/or the external surface of the fractal-structure body may be coated with ceramics, semiconductors, or metals on a part or the whole thereof.

A first method of manufacturing the fractal-structure body of the present invention is a method of manufacturing a three-dimensional fractal structure by stacking secondary basic units of the structure, which are formed one on another from an energy beam-hardened resin through selective irradiation with an energy beam, and solidification thereof. Use of a photocurable resin is preferable, in which case thin layers formed by stereolithography using laser beam are stacked one on another so that a solid object which is hollow inside thereof can be formed.

According to the first manufacturing method of the present invention, the energy beam-hardened resin may include ceramic particles so as to form and stack the secondary basic units of the fractal-structure body that include the ceramic particles one on another, and fire the stack so as to burn out the energy beam-hardened resin thereby forming a fractal-structure body made of a sintered ceramic material.

A second method of manufacturing the fractal-structure body of the present invention is a method of manufacturing a three-dimensional fractal structure through a process of fabricating a mold having an inverted shape of the fractal-structure body, and a process of pouring a fluid material that can be hardened into the mold, solidifying the fluid material, and removing the mold.

In the second manufacturing method, sub-molds for divided portions of the fractal-structure body may be fabricated so as to make the mold of the fractal-structure body by assembling the sub-molds.

Another manufacturing method of the present invention is a method of manufacturing a three-dimensional fractal-structure body by fabricating divided basic units of the fractal-structure body and joining the basic units.

In this method, fine holes may be formed by means of a high energy beam or the like in the sub-structures or in the fractal-structure body after joining.

According to this manufacturing method, the basic units may also be formed by an injection molding process.

The fractal-structure bodies of the present invention are capable of selectively cutting off transmission or reflection of electromagnetic waves of a particular wavelength (including visible light), and can substantially confine (localize) electromagnetic waves completely within a region of space.

DESCRIPTION OF REFERENCE NUMERALS

Figure 1:
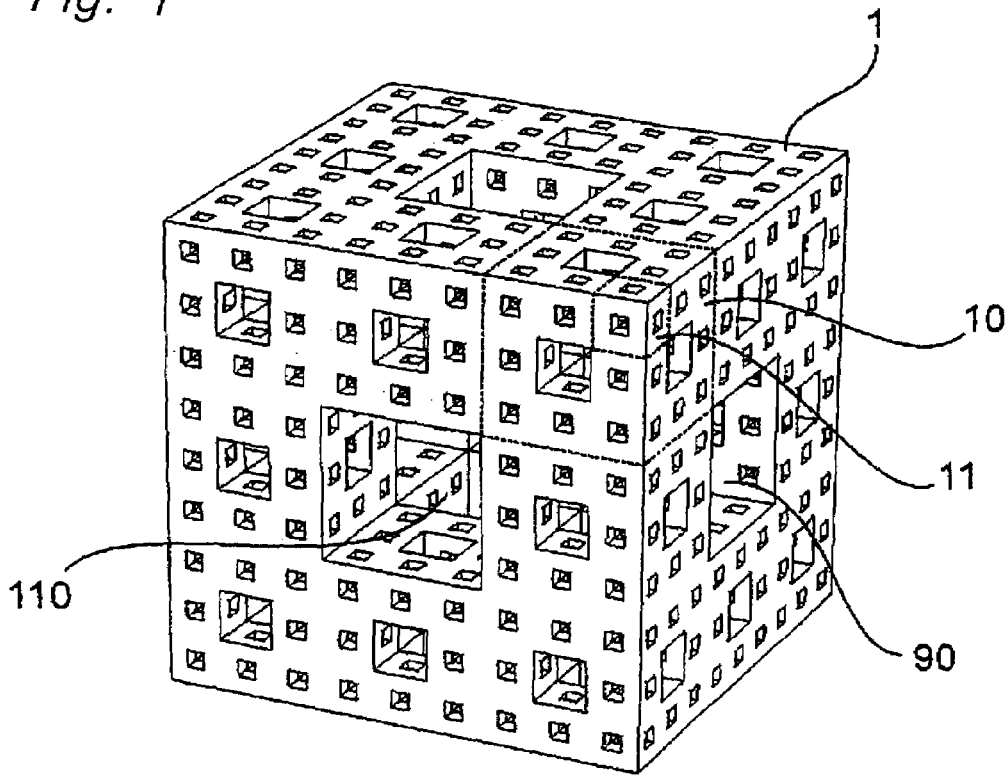
FIG. 1 is a perspective view of a Menger sponge-type fractal-structure body of the present invention.

1: Fractal-structure body
2: Original cube for making the fractal-structure body 1
3: Small cube formed by dividing the original cube into 27 portions.
4: Basic unit of three-dimensional fractal-structure body 1
10: Basic unit of the second stage
11: Basic unit of the third stage
12: Square prism-shaped cavity penetrating a face center of the three-dimensional fractal-structure body 1
13: Square prism-shaped cavity penetrating a face center of the basic unit 10 of the second stage
14: Square prism-shaped cavity penetrating a face center of the basic unit 11 of the third stage
20: Photocurable resin solution
30: Ultraviolet laser beam
40: Modeling table
50: Sample of fractal-structure body
60: Monopole antenna
70: Monopole antenna
80: Electromagnetic wave absorber
90: Square prism-shaped cavity penetrating a face center of the three-dimensional fractal structure body 1

DETAILED DESCRIPTION OF THE INVENTION

Embodiments of the present invention will now be described below by making reference to the accompanying drawings.

Embodiment 1

The fractal-structure body according to one embodiment of the present invention has a three-dimensional fractal structure in part or whole thereof, so as to localize electromagnetic waves of a particular wavelength within the fractal structure.

More specifically, the three-dimensional fractal structure of this embodiment is a regular hexahedron (referred to as hexahedron of $0^{th}$ order) measuring 'a' along one edge, which is made by the following procedure.

(1) The hexahedron of $0^{th}$ order is divided into hexahedrons of first order having a size 1/S of the original. A predetermined number of hexahedrons of first order are removed so as to form primary cavities each of which penetrates the hexahedron of $0^{th}$ order from one face to the opposite face thereof. The primary cavities are formed in three directions so as to intersect at the center of the hexahedron of $0^{th}$ order.

The hexahedron of first order having a size 1/S of the hexahedron of $0^{th}$ order refers to a hexahedron that has a shape similar to that of the hexahedron of $0^{th}$ order and measures a/S along one edge. A length of one side of the intersection of the primary cavity with one face of the hexahedron of $0^{th}$ order is n times the length of one edge (a/S) of the hexahedron of first order, n being an integer referred to as the number of removed elements. S is referred to as the reduction number in this specification.

(2) The hexahedrons of first order are divided into hexahedrons of second order, measuring 1/S times the former. A predetermined number of hexahedrons of second order are removed from the hexahedrons of first order so as to form secondary cavities, each of which penetrates a hexahedron of first order from one face to the opposite face thereof. The secondary cavities are formed in three directions so as to intersect at the center of the hexahedrons of first order. The number of hexahedrons of second order removed from the hexahedron of first order is the same as the number of hexahedrons of first order removed from the hexahedron of $0^{th}$ order in step (1). The hexahedron of second order measuring 1/S times the hexahedron of first order means a hexahedron measuring $a/S^2$ along one edge thereof.

Accordingly, the secondary cavity has one edge n times as long as one edge ($a/S^2$) of the hexahedrons of second order. The hexahedron with a size reduced to 1/S constituted from the hexahedron of $0^{th}$ order and the primary cavities of scaled down sizes are made as described above, thus forming the hexahedron fractal structure of stage 2. The structure constituted from the hexahedron of first order and the secondary cavities has a shape similar to the entire structure constituted from the hexahedron of $0^{th}$ order and the primary cavities.

(3) The operations described above are repeated the required number of times so as to form hexahedrons of second order and the third order cavities, hexahedrons of third order and the fourth order cavities, and so on, thereby to manufacture the hexahedron fractal structure of stage 3, stage 4, and so on.

The fractal-structure body constituted as described above is capable of localizing, within the fractal-structure body, electromagnetic waves (including visible light) of a particular wavelength that is proportional to the square root of the mean volume dielectric constant $\in$ that is determined from one side, an/S, of the primary cavities and the structural factors of the fractal structure, and the dielectric constant of the material that constitutes the fractal structure.

A hexahedron fractal structure made of a dielectric material, in particular, can localize electromagnetic waves of a particular wavelength determined by the following formula within the fractal structure.

$$2a\sqrt{\in}n/S \quad \text{[Equation 4]}$$

The mean volume dielectric constant of the fractal-structure body in the above formula is given by the following equation.

$$\in = \in_{mat} V_f + \in_a (1 - V_f) \quad \text{[Equation 5]}$$

$$V_f = (N/S^d)^m \quad \text{[Equation 6]}$$

where $\in_{mat}$ is the dielectric constant of the material that constitutes the fractal-structure body, $V_f$ is the proportion of the volume occupied by the material that constitutes the fractal-structure body, and $\in_a$ is the dielectric constant of the cavity.

N is the number of self-similar objects, namely the number of hexahedrons of $(k+1)^{th}$ order that remain after removing a predetermined number of hexahedrons of $(k+1)^{th}$ order from the hexahedrons of $(k+1)^{th}$ order created by dividing the hexahedron of $k^{th}$ order so as to form the $(k+1)^{th}$ cavities.

The letter d denotes the number of dimensions of the space, and is typically 3. The letter D denotes the fractal dimension that is determined from the number of self-similar objects N and the reduction number S.

The fractal dimension D of a fractal structure constituted from N elements having size 1/S times the entire structure is defined by $N = S^D$, and quantitatively represents the complexity of the fractal structure. An integral number for D such as 1, 2 or 3 means a simple structure of a one-dimensional, two-dimensional, or three-dimensional object, respectively. A fractal structure, in contrast, is characterized by a fractal dimension D of a fractional value. For example, fractal dimension D of 2 or more, for example 2.7, implies a complex structure that is unlike a simple two-dimensional or three-dimensional object. In this specification, a fractal structure that has a fractal dimension D larger than 2 is defined as a three-dimensional fractal structure.

The letter m denotes the stage number.

The fractal structure is characterized by a hierarchical nested structure of equally divided portions each having a structure similar to the entire structure, and sub-divided portions created by dividing the former portions are also similar to the entire structure. The level of one division of the sequence of divisions is the stage number m. As the stage number m increases, the fractal structure becomes a more complex hierarchical structure constituted from a larger number of tiny sub-structures nested in many levels.

Confinement (localization) of electromagnetic waves according to the present invention is basically different from the localization of electrons that depends on the impurity level of a semiconductor, or localization of electromagnetic waves due to defect levels formed in a photonic crystal, namely confinement within a band gap of electrons or a photonic band gap, in that the electromagnetic wave is confined within the three-dimensional fractal structure without the need of any band gap.

That is, the present invention enables perfect absorption of electromagnetic waves of a particular wavelength without reflection, and realizes an ideal material that shields and absorbs electromagnetic waves, which has been impossible with conventional materials. It also realizes a new form of laser or maser oscillation by directing electromagnetic waves that are confined within the fractal structure through resonance at a particular wavelength in a particular direction. In addition, applications are conceived such as electromagnetic waves that are locally confined and amplified to have a higher energy density used in the heating of various materials, and applications for the development of new energy sources including nuclear fusion.

Now a fractal-structure body of the first embodiment will be described by way of a specific example.

Figure 2:
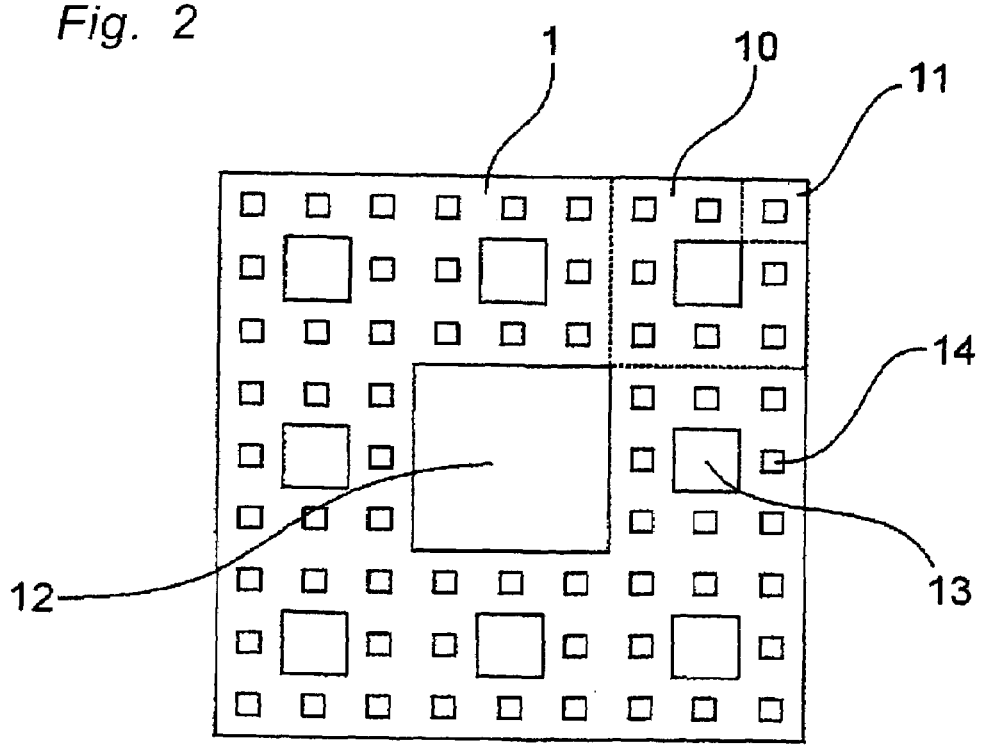
FIG. 2 is a plan view of the Menger sponge-type fractal-structure body shown in FIG. 1.
Figure 3A:
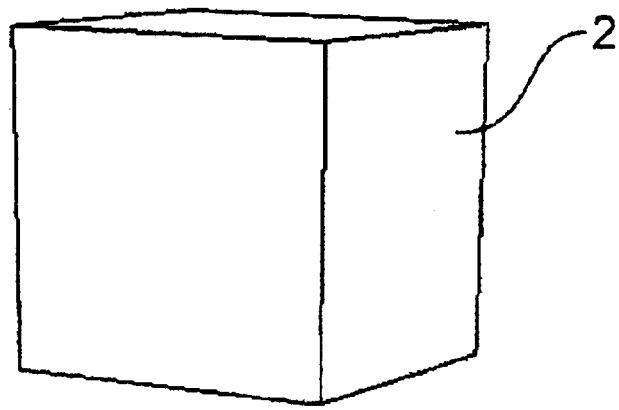
FIG. 3A is a perspective view of a cube as an initial cube for forming the Menger sponge-type fractal-structure body shown in FIG. 1.
Figure 3B:
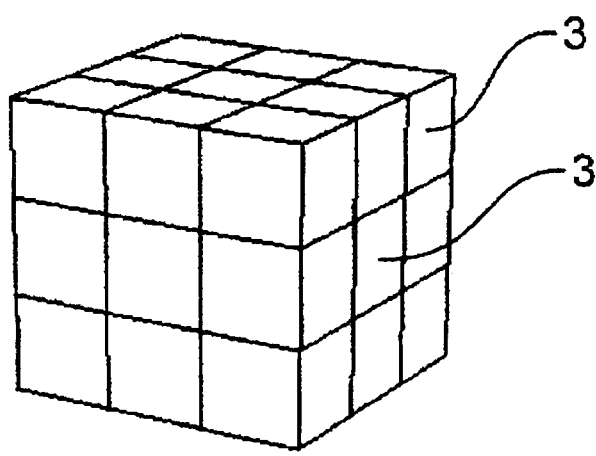
FIG. 3B is a perspective view of the cube divided into 27 small cubes with the edge length reduced to one third of the original.

FIG. 1 is a perspective view showing a three-dimensional fractal-structure body 1 as an example of the fractal-structure body of the first embodiment. FIG. 2 is a plan view of one face of the three-dimensional fractal-structure body 1 that has an identical configuration on every face thereof. This fractal-structure body has a cubic shape, and is formed by removing seven small cubes 3 from the center of each face and from the center of the original cube 2, among the 27 small cubes 3 (FIG. 3B) created by dividing every side of cube 2 shown in FIG. 3A into three equal portions, thereby forming a basic configuration 4 that has through-holes each having a shape of a square prism penetrating the faces at the center thereof (FIG. 3C).

Figure 3C:
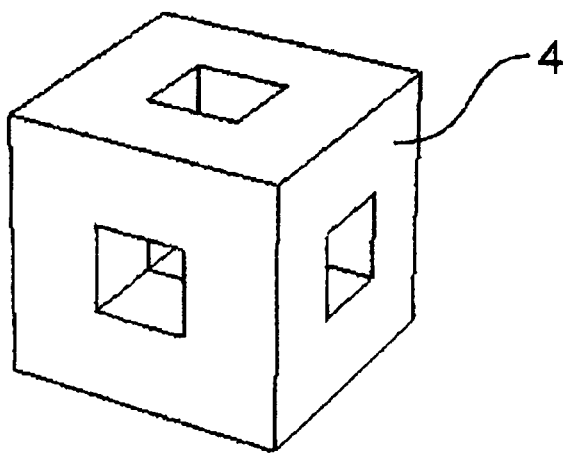
FIG. 3C is a perspective view of a fundamental fractal-structure pattern formed by removing seven small cubes from the center of each face and from the center of the entire cube from the 27 small cubes.

The cube 4 having through-holes penetrating the center as shown in FIG. 3C and the 20 small cubes 10, of similar shape, are formed by similar operations. Each small cube 10 further consists of 20 smaller cubes 11 of similar shape, having square through-holes penetrating the center thereof (refer to FIG. 1). Such a fractal-structure body is generally called a Menger sponge-type fractal structure. This example has three levels of hierarchy and is identified as stage 3. The level of hierarchy (stage number) to which the fractal-structure body is repeated in the nested structure can be increased further, so as to control the wavelength of the electromagnetic wave to be confined therein by means of the stage number and/or the unit size at each stage.

The Menger sponge-type fractal structure of this example consists of 20 cubes formed by dividing every edge of the larger cube into three equal portions, and therefore has fractal dimension D that satisfies $3^D=20$ and is determined as approximately 2.7268.

The Menger sponge-type fractal structure can be formed from various materials as long as a solid object that has a fractal structure can be formed. For example, a resin or a composite of resin with ceramic particles dispersed therein may be used. Such a composite material allows adjustment of the mean volume dielectric constant of the structure. For the resin, various synthetic resins may be used including an epoxy resin or an acrylic resin. For the ceramic particles, $TiO_2$ (titanium oxide), $SrTiO_3$ (strontium titanate), $BaTiO_3$ (barium titanate), $SiO_2$ (silicon oxide), or the like, may be used. In order to prevent the loss of localized electromagnetic waves or light from occurring, it is preferable to use ceramic particles of high dielectric constant or ceramic particles of low electromagnetic loss.

The resin may be oxidized and removed so as to form the Menger sponge structure made of ceramics, or the like, by firing the structure formed from a resin with ceramic particles dispersed therein, or pouring a ceramic slurry into a mold having a structure inverted from the Menger sponge formed from a resin, drying the slurry and firing. Such a process can increase the mean volume dielectric constant of the structure. For the resin, various synthetic resins may be used including an epoxy resin, an acrylostyrene copolymer, an acrylate resin or a polyvinyl acetal resin. For the ceramic particles, $TiO_2$ (titanium oxide), $SrTiO_3$ (strontium titanate), $BaTiO_3$ (barium titanate), $SiO_2$ (silicon oxide), or the like, may be used. In order to prevent the loss of localized electromagnetic waves or light from occurring, it is preferable to use ceramic particles of high dielectric constant or ceramic particles of low electromagnetic loss.

In the case where the Menger sponge-type fractal-structure body having a cubic shape measuring 'a' along one edge constituted as described above (FIG. 1) is formed from a dielectric material of mean volume dielectric constant $\in$, the value of n/S is ⅓ and electromagnetic waves of a particular wavelength corresponding to the following formula can be localized in the fractal structure.

$$\tfrac{2}{3} a \sqrt{\in} \qquad \text{[Equation 7]}$$

According to the first embodiment, the material used to form the three-dimensional fractal-structure body of the example described above is not limited to a dielectric material, and resins, ceramics, semiconductors, glasses, metals or a mixture of two or more of these materials may be used.

The point of the present invention is that, when electromagnetic waves enter into the three-dimensional fractal structure, electromagnetic waves of a particular wavelength that is determined by characteristic factors of the fractal structure (structural factors) are localized within the fractal structure by a special action of interference, so that substantially no reflection or transmission occurs. The structural factors refer to those that characterize the fractal structure such as elements defining the entire configuration (for example, a length of one edge) and the reduction ratio, and include the number N of self-similar units, fractal dimension D, reduction number S, and stage number m.

The wavelength of electromagnetic waves localized within the fractal structure formed from a dielectric material is given by a function related to the mean volume dielectric constant $\in$ of the dielectric material that constitutes the structure.

It has been verified that when electromagnetic waves of the particular wavelength are emitted within the fractal structure, the electromagnetic waves hardly leak out of the fractal structure, which means that the electromagnetic waves are successfully localized or confined.

While the electromagnetic waves localized or confined within the fractal structure are absorbed by resins, ceramics, semiconductors, glasses, metals or other materials that make the fractal structure through dielectric loss or ohmic loss, the electromagnetic waves can be stored for a certain period of time after the supply of the incident electromagnetic waves of the particular wavelength is cut off by selecting a low-loss material and increasing the stage number so as to decrease the volume proportion occupied by the material in the structure. When the electromagnetic waves of a particular wavelength are caused to remain incident under the conditions described above, it is easily expected that the stored energy of electromagnetic waves increases until an equilibrium is reached, thus making amplification possible.

In order to manufacture a fractal structure having a three-dimensional configuration, the structure is designed based on theoretical equations for calculating the configuration from a dielectric material, a shape and size of the basic unit, a stage number that represents the hierarchical level of the fractal structure, a shape and size of the entire structure, sizes of detailed structures, a dielectric constant and other parameters according to the wavelength of the electromagnetic waves to be controlled. The inner space of the fractal structure may be filled with vacuum, air, or other gas or liquid, but also may be filled with a dielectric material having a different value of dielectric constant. The dielectric material may be either one that highly absorbs electromagnetic waves, or one that does not absorb, namely effectively transmits electromagnetic waves.

In order to manufacture a three-dimensional fractal structure having a complicated shape, it is appropriate to employ a three-dimensional free forming method using a CAD/CAM system. When stereolithography is employed, for example, thin layers that constitute the three-dimensional fractal structure drawn by means of CAD are formed one-by-one from a photocurable resin through polymerizing solidification by irradiating it with an ultraviolet laser beam according to numerical data that represent the shape of each layer, thereby completing the three-dimensional structure.

The three-dimensional fractal-structure body may also be manufactured by A) forming a plurality of two-dimensional unit fractal-structure bodies that constitute the three-dimensional fractal-structure body from a photocurable resin by stereolithography, and B) stacking the two-dimensional unit fractal-structure bodies one on another, thereby constituting the three-dimensional fractal-structure body.

A resin has a dielectric constant typically from about 2 to 3. In order to form a fractal-structure body from a material having a higher dielectric constant, a proper quantity of a ceramic powder having a high dielectric constant such as $TiO_2$ (titanium oxide), $BaTiO_3$ (barium titanate), $CaTiO_3$ (calcium titanate), $SrTiO_3$ (strontium titanate), a powder of mixture thereof, other ceramic material, semiconductor, or metal may be mixed into the photocurable resin, which is then formed into the desired shape.

A fractal-structure body can also be manufactured from a sintered ceramic material, by forming the fractal-structure body and a structure having an inverted shape to the former by stereolithography from a photocurable resin having 5% to 80% by volume of ceramic particles of high dielectric constant mixed therein, firing the structure in air so as to burn out the photocurable resin and sintering the ceramic particles together.

Alternatively, a structure having a shape inverted from the desired fractal structure may be formed from a resin by stereolithography, and may be used as a mold to form the fractal structure from the ceramic slurry described above which is then sintered. The resin can be burned out by controlling the heating conditions. That is, A) a plurality of two-dimensional unit structures that collectively constitute a shape inverted from that of the three-dimensional fractal structure body are formed by stereolithography, B) the plurality of two-dimensional unit structures are stacked one on another to form the inverted structure of the three-dimensional fractal structure body, C) a molten fluid material of ceramics, semiconductor or metal slurry is poured into the inverted structure used as a mold and D) if necessary, the green compact is dried and sintered, or the photocurable resin is burned out thereby to manufacture the fractal-structure body.

The three-dimensional fractal-structure body 1 of the first embodiment can perfectly confine electromagnetic waves or light of a particular wavelength without reflection, by selecting the dielectric constant, fractal dimension D, stage number, size and other structural factors. This makes it possible to render various devices with such functions as perfectly absorbing electromagnetic waves or light, maser or laser oscillation, amplification, storing electromagnetic energy and electromagnetic heating.

The Menger sponge-type fractal-structure body of the first embodiment described above is constituted from units having a similar square shape in cross section. However, self-similarity can be partially maintained by constituting the structure from a plurality of units of such a cross-sectional shape as a triangle, circle, polygon, or different polygons, and effects similar to the functions described above can be obtained and utilized in controlling electromagnetic waves or light.

The Menger sponge-type fractal-structure body may also not necessarily be a cube, but may be another polyhedron, a parallelepiped elongated or reduced in one or more direction among X, Y and Z axes, in which case self-similarity can be partially maintained if constituted from triangles, circles, polygons, or a plurality of different polygons, and effects similar to the functions described above can be obtained and utilized in controlling electromagnetic waves or light.

The first embodiment provides the method of manufacturing the fractal structure body by stacking two-dimensional unit structures that constitute the desired fractal-structure body one on another. However, the present invention is not limited to this method, and the fractal-structure body may also be manufactured by forming holes in a cubic block by means of laser beam, or the like.

In addition to the above, the fractal-structure body may also be manufactured by a mechanical process. For example, holes may be formed in a cube made of a resin by means of an NC machine tool (numerically controlled machine tool). While the mechanical method is not suitable for a three-dimensional fractal structure that has a large number of holes to be formed, it is a convenient method for a planar fractal structure such as a two-dimensional Cantor fractal pattern.

Various rapid prototyping methods, for example a powder solidification method, may also be employed to form the three-dimensional fractal structure according to a principle of modeling similar to stereolithography. The rapid prototyping method refers to a free forming method that uses a CAD/CAM system, and the powder solidification method is a modeling method where layers made of ceramic or metallic powder are stacked one on another to form the solid shape that is then sintered, or layers are sintered one by one by means of a laser and then stacked one on another.

With another manufacturing method, basic units (denoted with 10 in FIG. 1) that constitute the fractal structure (denoted with 1 in FIG. 1) having the desired three-dimensional fractal structure are fabricated, and the 20 basic units 10 thus fabricated are assembled into the three-dimensional fractal-structure body 1.

This method enables easy manufacture of the fractal-structure body 1 by making the basic units 10 by an injection molding process and assembling the basic units.

According to this method, 400 element units 11 that are subdivisions of the basic unit 10 may be made and assembled to form 20 basic units 10 that are assembled into the fractal-structure body 1 that is the final product.

With this method, the element unit 11 can be more easily formed because of a smaller number of holes that are required to be formed than in the case of the fractal structure body 1 and the basic unit 10, thus allowing an easier manufacturing process.

Injection molding of the element units 11 may also be carried out by injecting a thermosetting resin into an injection mold that can be divided into six parts and has rods protruding into a cavity so as to form a blank for the element unit 11, forming the holes by means of a laser beam, or the like, thereby making the element units 11. This also applies to a case where the basic units 10 are formed by injection molding.

In the injection molding, a liquid crystal resin of low viscosity, polycarbonate resin, or the like, are preferably used among thermosetting resins.

According to this method, the holes may be formed by a laser beam machine, or the like, when fabricating the basic units 10 or the element units 11.

According to the present invention, the fractal-structure body 1 may also be manufactured by making the first layer and the third layer among three constituent layers of the fractal-structure body 1 shown in FIG. 1, making basic units 10 that constitute the second layer, and assembling these portions.

In this case, the first layer and the third layer that have the same shape may be formed by using the same mold.

The fractal-structure body of the present invention can be manufactured by various methods as described above.

The first embodiment deals with a hexahedron or cube, for the ease of understanding the structure. However, the fractal-structure body of the present invention is not limited to these shapes. The fractal-structure body of the present invention has such a constitution as the structures of $n^{th}$ order (n=1, 2, 3, and so on) are divisions of the structure of $(n-1)^{th}$ order, the structures of $n^{th}$ order being similar in shape to all of the structure of $0^{th}$ through $n^{th}$ order, wherein low reflection characteristics or a localizing function can be provided for electromagnetic waves of a particular wavelength determined by the structural factors. The structure of $0^{th}$ order means the structure that forms the entire profile of the fractal-structure body. The structure of first order is the structure formed by dividing the structure of $0^{th}$ order. The structure of second order is the structure formed by dividing the structure of first order, and has a shape similar to that of the structure of first order.

Embodiment 2

The second embodiment of the present invention relates to a fractal-structure body and a super structure of fractal-structure bodies.

While the first embodiment deals with a fractal-structure body that is the basis of the present invention, in practice it is preferable that decreasing of the reflectivity and transmissivity of electromagnetic waves or light can be achieved over an arbitrary region. However, it has been found in an experiment conducted by the present inventors, that decreasing the reflectivity and transmissivity of electromagnetic waves or light of a particular wavelength cannot be achieved simply by connecting a plurality of the fractal-structure bodies of the first embodiment. The second embodiment provides a fractal-structure body and a super structure thereof that enable it to decrease the reflectivity and transmissivity of electromagnetic waves or light of a particular wavelength, that is localized within a certain region, over a wider area, thus allowing for wider applications.

The second embodiment deals with a Menger sponge-type fractal-structure body having cubic shape measuring 'a' along one edge shown in FIG. 1 as the basic structure, and a super structure of the fractal structures that share a part of the structure. The super structure of the fractal structures of the second embodiment enables it to achieve the functions of the Menger sponge-type fractal-structure body having the shape of a cube and to decrease reflectivity and transmissivity of electromagnetic waves of a particular wavelength or light over a wider area. In the second embodiment, a partial structure of a fractal is formed by removing a plate-shaped portion from a Menger sponge-type fractal-structure body having a cubic shape, which can greatly decrease the reflectivity only. The reflectivity is greatly decreased over a wider region by means of a super structure of partial fractal-structure bodies constituted by sharing a part of the partial fractal-structure bodies described above.

The second embodiment provides a fractal-structure body and a super structure thereof based on the findings obtained by the present inventors.

The fractal-structure body serving as the basis of the second embodiment is formed from a dielectric material and has low transmissivity and low reflectivity for electromagnetic waves of a particular wavelength that is determined by the following formula and confines electromagnetic waves of the particular wavelength.

$$2a\sqrt{\in_n}/S \qquad \text{[Equation 8]}$$

In the second embodiment, the following formula that extends the formula described above to higher orders will be used.

$$2^p a\sqrt{\in_n}/S^{2p-1} \qquad \text{[Equation 9]}$$

where p is the order of the electromagnetic wave propagation mode, and is an integer greater than or equal to one.

Validity of this formula will be described later in the case of examples of various fractal-structure bodies.

The fractal-structure body of the present invention is capable of confining electromagnetic waves of the particular wavelength determined by the formula described above, and has the characteristic to decrease the transmissivity, for example, to 20 dB or less and reflectivity to −5 dB or less for the particular wavelength.

The fact that, when electromagnetic waves enter into the three-dimensional fractal structure or a super structure thereof, electromagnetic waves of a particular wavelength determined by the size of the fractal structure and mean dielectric constant are localized within the fractal structure by a special action of interference, so that substantially no reflection or transmission occurs, was found by the present inventors.

The three-dimensional fractal-structure body can be used as a perfect absorber that confines and absorbs electromagnetic waves of the particular wavelength of the above mode with substantially no reflection or transmission, and has various applications.

Various super structures of fractal structures constituted from such basic configurations will now be described below.

The first aspect is a super structure of Menger sponge type fractal-structure bodies having a wall or column shape formed by connecting a plurality of Menger sponge-type fractal-structure bodies each having cubic shape measuring 'a' along one edge so that regions of size ⅓ to ⅑ of one edge 'a' are shared in the vertical and/or horizontal faces of the Menger sponge-type fractal structure.

The super structure of fractal-structure bodies constituted as described above hardly transmits electromagnetic waves of the particular wavelength determined by the following formula, with transmissivity of 20 dB or less and reflectivity of −5 dB or less.

$$2^p a \sqrt{\in n}/S^{2p-1} \quad \text{[Equation 10]}$$

The shared region of the Menger sponge-type fractal-structure body is ⅓ of one edge 'a' means that the fractal pattern obtained by dividing one edge 'a' into three equal parts is shared. The common region of the Menger sponge-type fractal-structure body is ⅑ of one edge 'a' means that the fractal pattern obtained by dividing one edge 'a' into nine equal parts is shared.

Figure 13A:
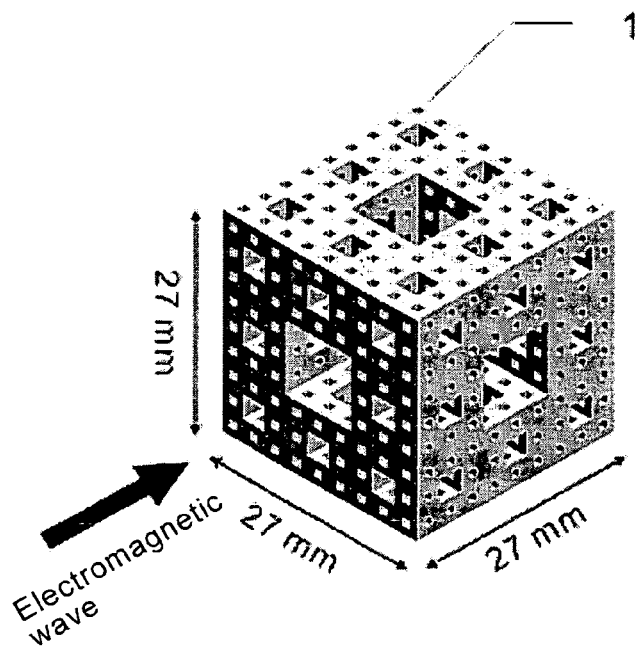
FIG. 13A is a perspective view of a Menger sponge-type fractal-structure body at stage 3 having cubic shape.
Figure 13B:
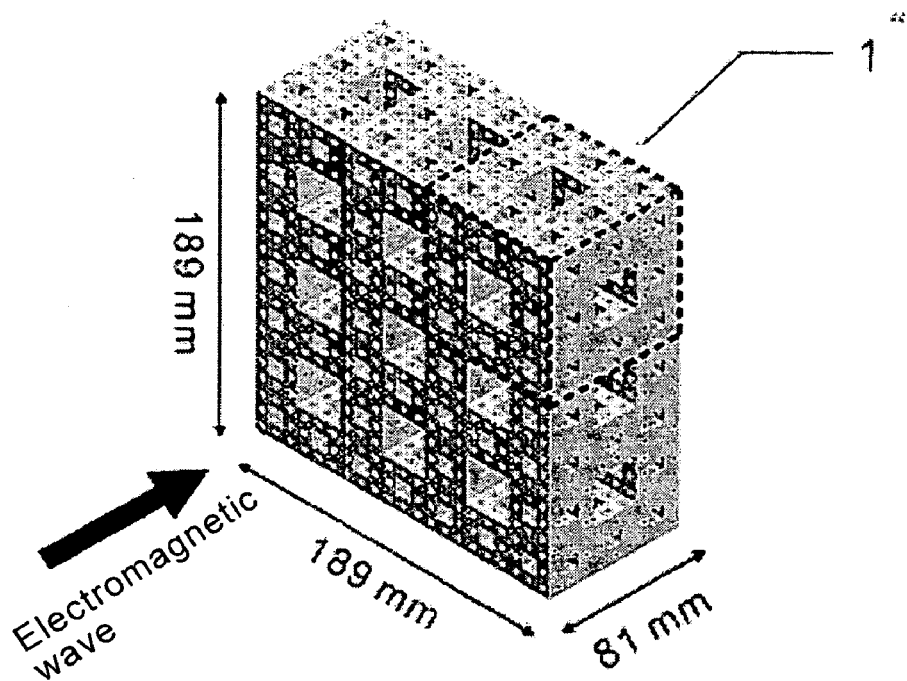
FIG. 13B is a perspective view of a super structure constituted from 3-by-3 pieces of the Menger sponge-type fractal-structure bodies at stage 4 having a cubic shape placed one on another with a portion one third of one edge 'a' of the element cube of the Menger sponge-type fractal structures at stage 3 being shared by adjacent element cubes on vertical and horizontal faces.

FIG. 13B shows an example of the first aspect that is a super structure of stage 4 having a wall shape constituted from 3-by-3 pieces of the Menger sponge-type fractal-structure bodies of stage 3 (FIG. 13A) having a cubic shape measuring 'a' along one edge placed one on another with portions one third of the edge 'a' being shared on vertical and horizontal faces.

The second aspect is a plate-shaped fractal structure body constituted by removing a plate-shaped portion having thickness of ⅓ to ⅑ of one edge a from the Menger sponge-type fractal-structure body of stage 3 having a cubic shape measuring 'a' along one edge, thus forming a partial structure of the Menger sponge-type fractal-structure body.

The plate-shaped fractal-structure body constituted as described above decreases reflectivity for electromagnetic waves of the particular wavelength determined by the following formula, with reflectivity of, for example, −5 dB or less.

$$2^p a \sqrt{\in n}/S^{2p-1} \quad \text{[Equation 11]}$$

Figure 13C:
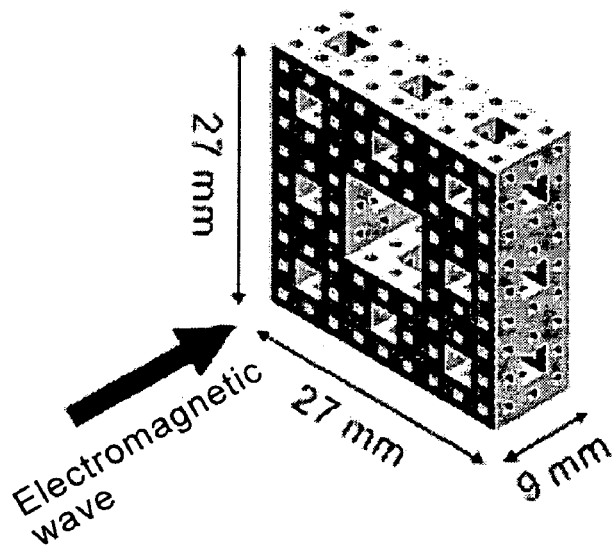
FIG. 13C is a perspective view of a partial structure of the fractal constituted by removing a plate-shaped portion having thickness ⅓ of one edge 'a' from the Menger sponge-type fractal-structure body at stage 3 having a cubic shape.

FIG. 13C shows an example of the second aspect which is a thin wall-shaped partial structure constituted by removing a plate-shaped portion having thickness ⅓ of edge 'a' from the Menger sponge-type fractal-structure body (FIG. 13A) of stage 3 having a cubic shape.

The third aspect is a super structure of Menger sponge-type fractal-structure bodies having a wall or column shape constituted by connecting a plurality of the partial structures of the Menger sponge-type fractal-structure bodies that are constituted by removing a plate-shaped portion having thickness ⅓ to ⅑ of edge 'a' from the Menger sponge-type fractal-structure body having a cubic shape, so that regions of size ⅓ to ⅑ of one edge 'a' are shared in the vertical and/or horizontal faces of the Menger sponge-type fractal-structure body.

The super structure of the fractal structure bodies constituted as described above has a low reflectivity of −5 dB or less for electromagnetic waves of the particular wavelength determined by the following formula.

$$2^p a \sqrt{\in n}/S^{2p-1} \quad \text{[Equation 12]}$$

Figure 13D:
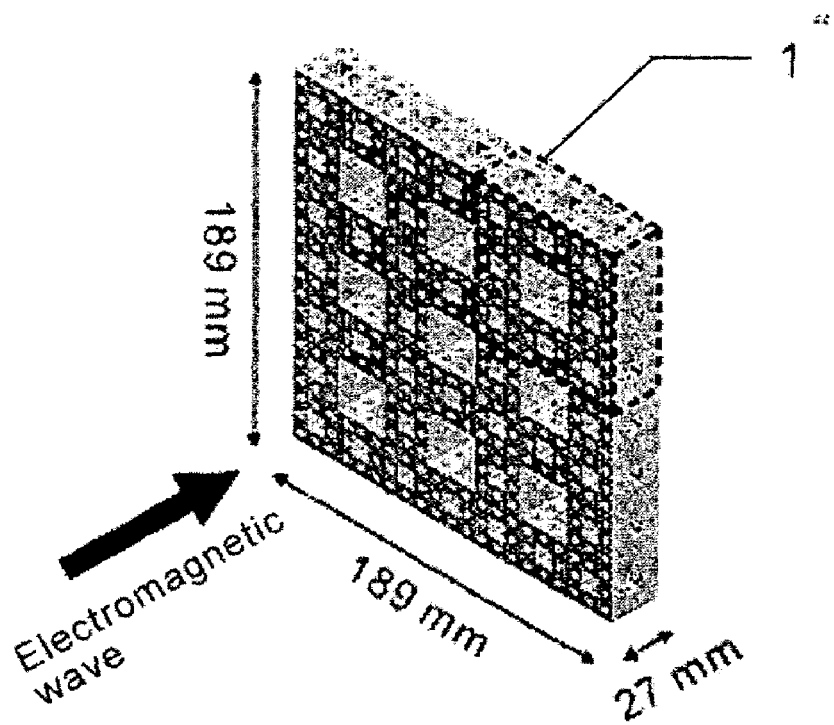
FIG. 13D is a perspective view of a super structure constituted from 3-by-3 pieces of the Menger sponge-type fractal structures at stage 4 having a portion ⅓ of one edge 'a' of the partial structure being shared by adjacent element cubes on vertical and horizontal faces.

FIG. 13D shows an example of the third aspect that is a thin wall-shaped super structure of stage 4 constituted from 3-by-3 pieces of the Menger sponge-type partial fractal structures so that regions of size ⅓ of one edge 'a' are shared in the vertical and/or horizontal faces of the thin wall-shaped structure of FIG. 13C.

The fourth aspect is a cavity-penetrated plate-shaped fractal-structure body constituted by penetrating a two-dimensional Cantor fractal pattern of square shape measuring 'a' on one side to a certain thickness in a direction perpendicular to the surface, thus forming a plate-shaped structure. The cavity-penetrated plate-shaped fractal-structure body is capable of decreasing the transmissivity for electromagnetic waves of a particular wavelength corresponding to the following formula to −5 dB or less.

$$2^p a \sqrt{\in n}/S^{2p-1} \quad \text{[Equation 13]}$$

Figure 13E:
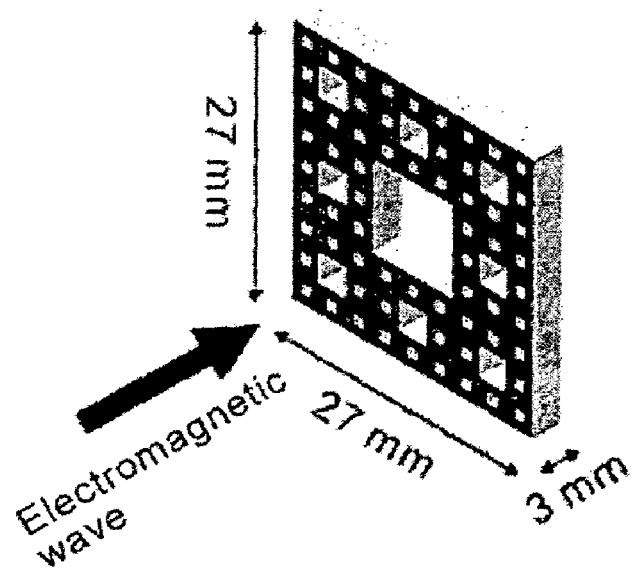
FIG. 13E is a perspective view of a plate-shaped structure having a hole of a two-dimensional Cantor fractal pattern formed to penetrate therethrough.

FIG. 13E shows an example of the fourth aspect that is a plate-shaped structure with holes formed in a two-dimensional Cantor fractal pattern.

The fifth aspect is a super structure of the cavity-penetrated plate-shaped fractal-structure bodies having a wall or column shape constituted by connecting a plurality of the plate-shaped structures having holes in a two-dimensional Cantor fractal pattern of a square shape measuring 'a' on one side so as to share a region ⅓ to ⅑ of edge 'a' of the two-dimensional Cantor fractal pattern. The super structure of fractal structures constituted as described above has low reflectivity of, for example, −5 dB or less for the particular wavelength determined by the following formula.

$$2^p a \sqrt{\in n}/S^{2p-1} \quad \text{[Equation 14]}$$

The fractal-structure bodies and the super structure thereof according to the second embodiment can be manufactured similarly to the first embodiment.

For example, a structure formed from a resin that includes ceramic particles dispersed uniformly therein may be fired in air. Alternatively, a ceramic slurry is poured into a mold having a structure inverted from the Menger sponge formed from a resin, that is dried and fired. In either case, the resin can be burned out so as to form the Menger sponge structure from ceramics. This enables an increase of the mean volume dielectric constant of the structure. For the resin, various synthetic resins may be used including an epoxy resin or an acrylate resin.

As in the second embodiment, a super structure of the Menger sponge-type fractal structure can be formed by combining a plurality of Menger sponge-type fractal structures so as to share part thereof, thus achieving the functions of the Menger sponge-type fractal-structure body to localize electromagnetic waves or light and decrease the reflectivity also by means of the super structure thereof. It is also possible to greatly decrease only the reflectivity by means of a thin wall-shaped fractal structure having a two-dimensional pattern of a Menger sponge-type fractal-structure penetrating into the plate-like structure and the super structure that shares portions thereof. The partial structure of the Menger sponge-type fractal structure and the super structure allow for efficient use in various applications to be described later.

The fractal-structure bodies shown in FIGS. 13A through 13E may be manufactured as integral objects by stereolithography, or by assembling a number of Menger sponge-type fractal-structure bodies formed by stereolithography as elements as shown in FIGS. 13B, 13C and 13D.

The second embodiment deals with fractal-structure bodies and a super structure of fractal-structure bodies formed mainly from dielectric material, but the present invention is not limited to dielectric material.

Embodiment 3

The three-dimensional fractal-structure body constituted as described above can be used as a perfect absorber that confines and absorbs electromagnetic waves of a particular wavelength with substantially no reflection or transmission, and has various applications.

Now applications for the fractal-structure bodies of the first and second embodiments will be described below as the third embodiment.

The fractal-structure body of the present invention can be used as a filter that perfectly shuts off electromagnetic waves of a particular wavelength.

For example, a fractal-structure body formed from a dielectric material measuring 'a' along one edge can be used as a filter that perfectly shuts off electromagnetic waves of particular wavelength by localizing the electromagnetic waves corresponding to the following formula within the fractal structure with substantially no reflection of electromagnetic waves or light.

$$2a\sqrt{\in}n/S \qquad \text{[Equation 15]}$$

The three-dimensional fractal-structure body of the present invention having one or more minute holes formed therein to communicate with the outside, or a glass fiber or a metal wire inserted therein, has the functions of a laser or maser to amplify electromagnetic waves of particular wavelengths or light that is incident thereon from the outside, or generated therein, through resonance in the confined space and extract coherent electromagnetic waves or light to the outside. Since this laser function does not require oscillation energy, it makes laser oscillation without the restriction of a threshold possible. The wavelength of the laser oscillation can be freely controlled by varying the size, pattern and dielectric constant of the fractal structure.

For example, a fractal structure body formed from a dielectric material measuring 'a' along one edge can be used in laser or maser oscillation by localizing electromagnetic waves of a particular wavelength corresponding to the following formula within the fractal structure, so as to make maser or laser oscillation possible for the electromagnetic waves or light subjected to energy amplification within the structure.

$$2a\sqrt{\in}n/S \qquad \text{[Equation 16]}$$

The fractal-structure body of the present invention may also be used to form a buffer storage for light or electromagnetic waves that has applications in the fields of communication equipment and electronic devices.

For example, a fractal-structure body formed from a dielectric material measuring 'a' along one edge can be used in storing electromagnetic waves or light, namely as a light or electromagnetic wave condenser, by localizing the electromagnetic waves or light of a particular wavelength corresponding to the following formula within the structure with a certain length of relaxation time to achieve storage and energy amplification, thus providing for applications in the fields of communication equipment and electronic devices.

$$2a\sqrt{\in}n/S \qquad \text{[Equation 17]}$$

The fractal-structure body of the present invention may also be used to form an electromagnetic furnace, cooking apparatus, induction processing apparatus or the like.

For example, a fractal-structure body formed from a dielectric material measuring 'a' along one edge can be used in storing electromagnetic energy with higher density, by localizing the electromagnetic waves of a particular wavelength corresponding to the following formula within the structure so as to convert the localized electromagnetic waves into thermal energy in the fractal structure while forming the three-dimensional fractal structure body from a material having low loss and high melting point that is cooled with water, thus providing for applications in the fields of electromagnetic furnaces, cooking apparatuses, induction processing apparatuses, or the like.

$$2a\sqrt{\in}n/S \qquad \text{[Equation 18]}$$

The fractal-structure body of the present invention may also be used to make an efficient light collector for a solar cell.

For example, a tiny fractal-structure body formed from a dielectric material measuring 'a' along one edge can be used to make a super structure of three-dimensional or two-dimensional tiny fractal structures capable of localizing and storing solar light that can be used as an efficient light collector for a solar cell, by designing the fractal structure so as to be capable of collecting solar light having wavelength corresponding to the following formula within the structure.

$$2a\sqrt{\in}n/S \qquad \text{[Equation 19]}$$

The three-dimensional fractal-structure body according to the present invention and a super structure thereof can be used as a heat source by localizing electromagnetic waves of a particular wavelength and causing the electromagnetic waves to be absorbed in metal.

For example, by embedding a tiny three-dimensional fractal-structure body in a human body and irradiating the three-dimensional fractal-structure body with electromagnetic waves of the particular wavelength supplied from the outside, only the fractal-structure body can be heated so as to provide localized thermal therapeutic treatment.

The three-dimensional fractal-structure body that localizes electromagnetic energy therein can be used in sterilizing food or medical devices inserted in the structure.

The fractal-structure body according to the present invention can also be used to form an antenna for high efficiency transmission or reception.

For example, a tiny fractal-structure body formed of a dielectric material measuring 'a' along one edge can be used to make an antenna for high efficiency transmission or reception of electromagnetic waves of the particular wavelength, by designing the three-dimensional fractal-structure body so as to localize and amplify electromagnetic waves of a particular wavelength corresponding to the following formula within the structure.

$$2a\sqrt{\in}n/S \qquad \text{[Equation 20]}$$

A number of three-dimensional fractal-structure bodies that are tuned so as to localize electromagnetic waves of slightly different frequencies and are arranged in a one-dimensional, two-dimensional or three-dimensional array can be used in a spectrum analyzer or a radio telescope.

For example, the fractal-structure body of the present invention can be used to make N three-dimensional fractal structures having different sizes from $a_1$ to $a_N$ along one edge and different values of mean volume dielectric constant from $\in_1$ to $\in_N$. These fractal structures can localize electromagnetic waves of particular wavelengths corresponding to the following formula within the structure.

$$2a_N\sqrt{\in_N}n/S \qquad \text{[Equation 21]}$$

A number of fractal-structure bodies that can localize electromagnetic waves of different frequencies arranged in one-dimensional, two-dimensional or three-dimensional array can be used in a spectrum analyzer.

A number of three-dimensional fractal-structure bodies having different sizes from $a_1$ to $a_N$ along one edge and different values of mean volume dielectric constant from $\in_1$ to $\in_N$ that are arranged in a one-dimensional, two-dimensional or three-dimensional array and tuned so as to localize electromagnetic waves of particular wavelengths corresponding to the following formula within the structure can be used in radio telescope.

$$2a_N\sqrt{\in_N}n/S \quad \text{[Equation 22]}$$

Tiny three-dimensional fractal-structure bodies can store light of a particular wavelength for a certain period of time and, when provided with a reading device, allows reading out the stored light of the particular wavelength from the tiny three-dimensional fractal-structure body. Thus the tiny three-dimensional fractal-structure body can be used as a ultra-high speed storage and computation medium.

For example, a tiny fractal-structure body measuring 'a' along one edge can be used to make an ultra-high speed storage and computation medium that can store light of a particular wavelength for a certain period of time and allows the stored light of the particular wavelength to be read out in combination with a reading device, by designing the fractal-structure body so as to localize and amplify electromagnetic waves of a particular wavelength corresponding to the following formula within the structure.

$$2a\sqrt{\in}n/S \quad \text{[Equation 23]}$$

A photonic crystal that totally reflects electromagnetic waves of a particular wavelength provided with a waveguide for electromagnetic waves or light and a three-dimensional fractal-structure body embedded therein can be used as an amplifier or condenser for electromagnetic waves or light, as the electromagnetic wave or light is stored and amplified in the fractal structure.

For example, an electromagnetic circuit that can store and amplify electromagnetic waves of particular a wavelength represented by the following formula in the fractal-structure body can be provided by providing a photonic crystal that totally reflects electromagnetic waves of a particular wavelength with a waveguide for electromagnetic waves or light and a three-dimensional fractal-structure body measuring 'a' along one edge embedded amid the waveguide.

$$2a\sqrt{\in}n/S \quad \text{[Equation 24]}$$

Also the fractal-structure body having structural units measuring $a_m$ along one edge and mean volume dielectric constant $\in_m$ in each stage so as to localize electromagnetic waves of a particular wavelength corresponding to the following formula can be used to constitute the filter, maser, laser, electromagnetic condenser, electric heating furnace, cooking apparatus, induction heating apparatus, collector for solar light, thermal medical treatment apparatus, sterilizing apparatus, antenna for high efficiency transmission or reception, radio telescope, ultra-high speed storage and computation medium and electromagnetic circuit described above.

$$2a_m\sqrt{\in_m}n/S \quad \text{[Equation 25]}$$

The fractal-structure body according to the present invention can be used as an absorber for electromagnetic waves of a particular wavelength.

For example, the fractal structure shown in FIG. 13C, FIG. 13D, FIG. 13E or a combination thereof and a super structure thereof may be tuned to have substantially zero reflectivity to electromagnetic waves of a particular wavelength, so as to be used as an absorber for electromagnetic waves of the particular wavelength.

The fractal-structure body according to the present invention can be used as an oscillator that efficiently generates harmonics of a particular wavelength.

For example, the three-dimensional fractal-structure body shown in FIG. 13A or FIG. 13B and a super structure thereof may be provided with a nonlinear optical crystal such as $LiNbO3$ or nonlinear optical element that is a photoconductivity antenna made of GaAs, or the like, inserted therein, or the fractal-structure body may be made of a nonlinear optical material, so as to efficiently generate harmonics of a particular wavelength through enhancement of the nonlinear optical effect, thus providing an oscillator. The structure shown in FIG. 13B provides for two-dimensional or three-dimensional oscillation.

The three-dimensional fractal-structure body shown in FIG. 13A or FIG. 13B and a super structure thereof may be provided with a nonlinear optical crystal such as ZnTe or $LiNbO_3$ or a nonlinear optical element that is a photoconductivity antenna made of GaAs, or the like, inserted therein, or the fractal structure body itself may be made of a nonlinear optical material, so as to be used as an oscillator that efficiently generates electromagnetic waves in a region of wavelengths from millimeter waves to terahertz waves through enhancement of the function to mix different frequencies or an optical rectification effect that is a nonlinear optical effect. The structure shown in FIG. 13B provides for two-dimensional or three-dimensional oscillation.

The fractal-structure body according to the present invention can be used to constitute an apparatus that converts electromagnetic energy into an electric current.

For example, the three-dimensional fractal-structure body shown in FIG. 13A or FIG. 13B and a super structure thereof may be used as an apparatus that converts localized electromagnetic energy into a current by localizing electromagnetic waves of a particular wavelength and inserting a metal conductor wire into the fractal-structure body.

The fractal-structure body according to the present invention can be used to constitute a modification apparatus that modifies and broadens the electromagnetic wave band of particular wavelengths.

For example, the three-dimensional fractal-structure body shown in FIG. 13A or FIG. 13B and a super structure thereof may be used as a modification apparatus that modifies and broadens the electromagnetic wave band of particular wavelengths, by localizing electromagnetic waves of a particular wavelength therein and providing a $PbZrTiO_3$-based piezoelectric material or element in the fractal-structure body or outside thereof, or forming a part or whole of the fractal structure from a piezoelectric material and applying a voltage to the piezoelectric material or to the element, so as to generate a strain in the fractal structure.

Example 1

The three-dimensional fractal structure of Example 1 related to the first embodiment will now be described below.

First, a method for manufacturing the three-dimensional fractal structure of Example 1 will be described. This method employs stereolithography which utilizes the photosensitive reaction of a photocurable resin in a liquid phase. In FIG. 4, arrows X and Y indicate two directions that intersect at right angles within a plane, and arrow Z indicates the direction perpendicular to the plane. A size of the Menger sponge may be arbitrarily set, for example, setting the length of one edge of cube 1 to 27 mm, and setting the length of one edge of the cavities of square prism shapes 12, 13 and 14 to 9 mm, 3 mm and 1 mm, respectively.

For the photocurable resin, an epoxy-based photocurable resin or an acrylate-based photocurable resin is used.

Figure 4A:
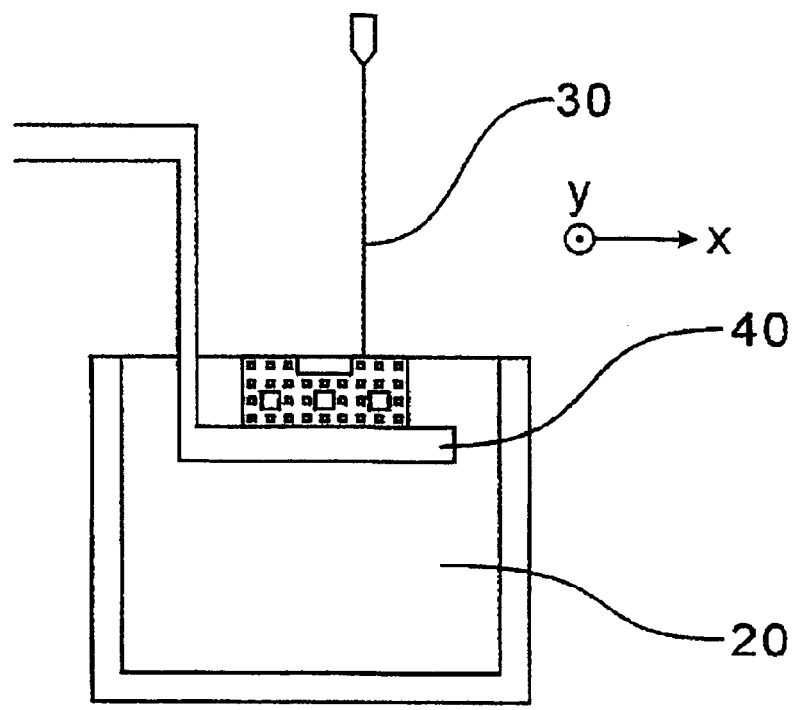
FIG. 4A is a schematic diagram (part 1) showing an example of method for manufacturing the Menger sponge-type fractal-structure body of FIGS. 1 and 2.
Figure 4B:
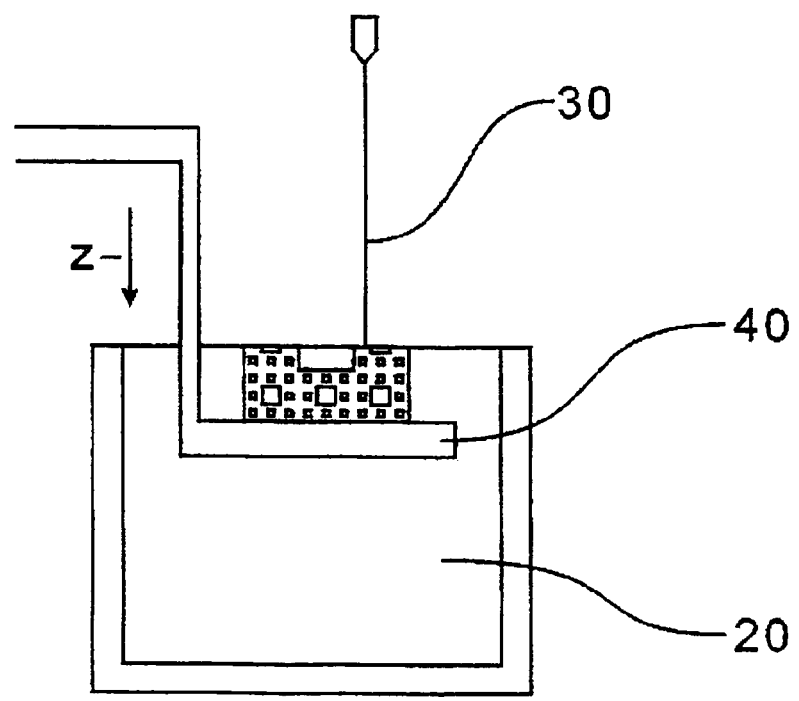
FIG. 4B is a schematic diagram (part 2) showing an example of method for manufacturing the Menger sponge-type fractal-structure body of FIGS. 1 and 2.

As shown in FIG. 4A and FIG. 4B, a table 40 is immersed in a photocurable resin 20 so that the table 40 is covered by a film of the photocurable resin (for example, an epoxy resin manufactured by D-MEC Ltd. under the trade name of SCR-730) of a predetermined thickness. Under this condition, an ultraviolet laser beam 30 is scanned in the direction of arrow X. This causes the photocurable resin irradiated by the ultraviolet laser beam 30 to harden. As the ultraviolet laser beam 30 is scanned repetitively in the direction parallel to arrow X and, if necessary, in the direction parallel to arrow Y or along a curved path according to STL data, a two-dimensional structure is formed on a substrate.

A two-dimensional structure is formed similarly to the second layer as the table 40 is lowered in the direction of arrow Z. The ultraviolet laser beam 30 is scanned according to STL data.

This operation is repeated a required number of times, to form the two-dimensional structures for a predetermined number of layers. The Menger sponge-type fractal-structure body can be easily manufactured from a resin by employing stereolithography (SCS-300P manufactured by D-MEC Ltd.).

(Method to Create STL Data)

The STL data is obtained by analyzing every one of the layers that constitute the Menger sponge-type fractal-structure designed by means of a CAD program (for example, Think Design Ver. 8.0 manufactured by Toyota Caelum Incorporated), with a slicing software (for example, SCR Slice-Software Ver. 2.0 manufactured by D-MEC Ltd.).

Characteristics of the Menger sponge-type fractal-structure body of Example 1 manufactured as described above were evaluated.

(Method to Measure Electromagnetic Wave Characteristics)

Figure 5:
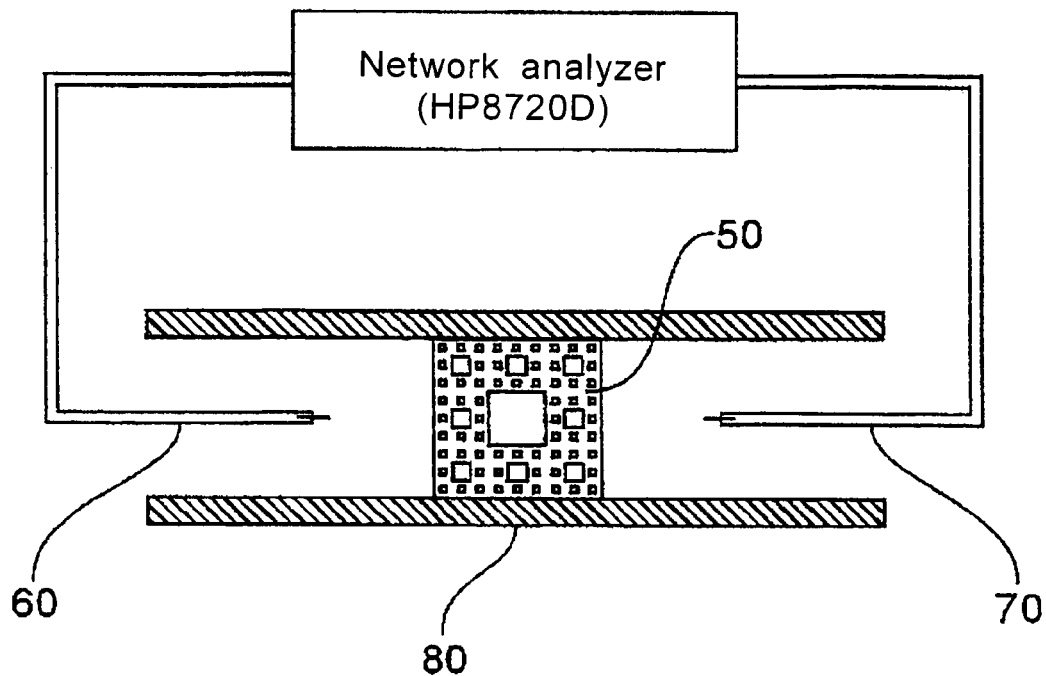
FIG. 5 is a schematic diagram showing a method for measuring the response of the Menger sponge-type fractal-structure body of FIG. 1 to electromagnetic waves.

FIG. 5 shows a method to measure electromagnetic wave characteristics of the Menger sponge-type fractal structure formed from an epoxy resin.

Monopole antennas 60, 70 are placed on the right and left sides of a sample 50 having a fractal structure and are connected to a network analyzer (HP8720D manufactured by Agilent Technologies). The attenuation of electromagnetic waves of the gigahertz band emitted from the antenna 60 when passing through the sample 50 is measured by receiving with the antenna 70, and reflectivity is measured by receiving with the antenna 60. During the measurement, the sample is surrounded by an electromagnetic wave absorbing material 80 made of a carbon fiber fabric, to eliminate the influence of unnecessary electromagnetic wave.

Figure 6A:
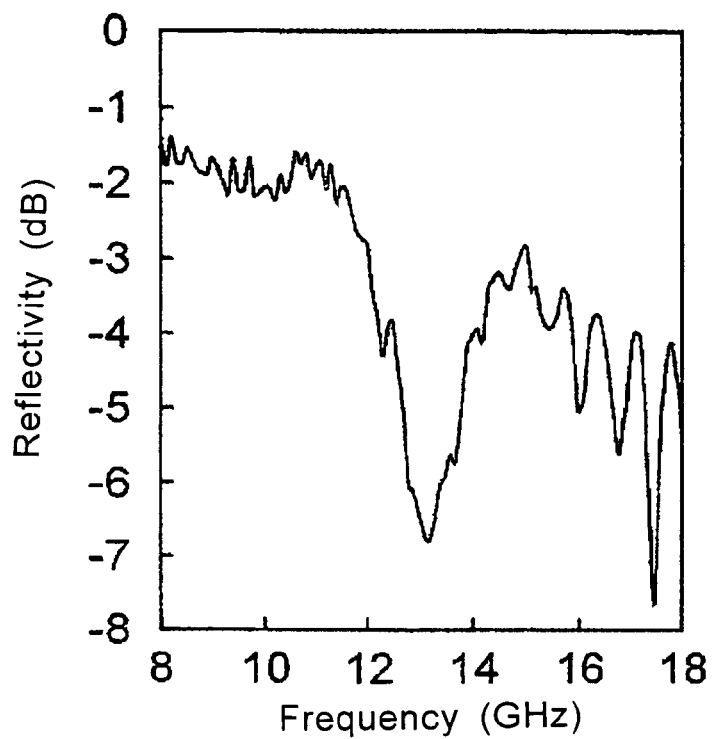
FIG. 6A is a reflection spectrum of the Menger sponge-type fractal-structure body of FIG. 1 for electromagnetic waves.
Figure 6B:
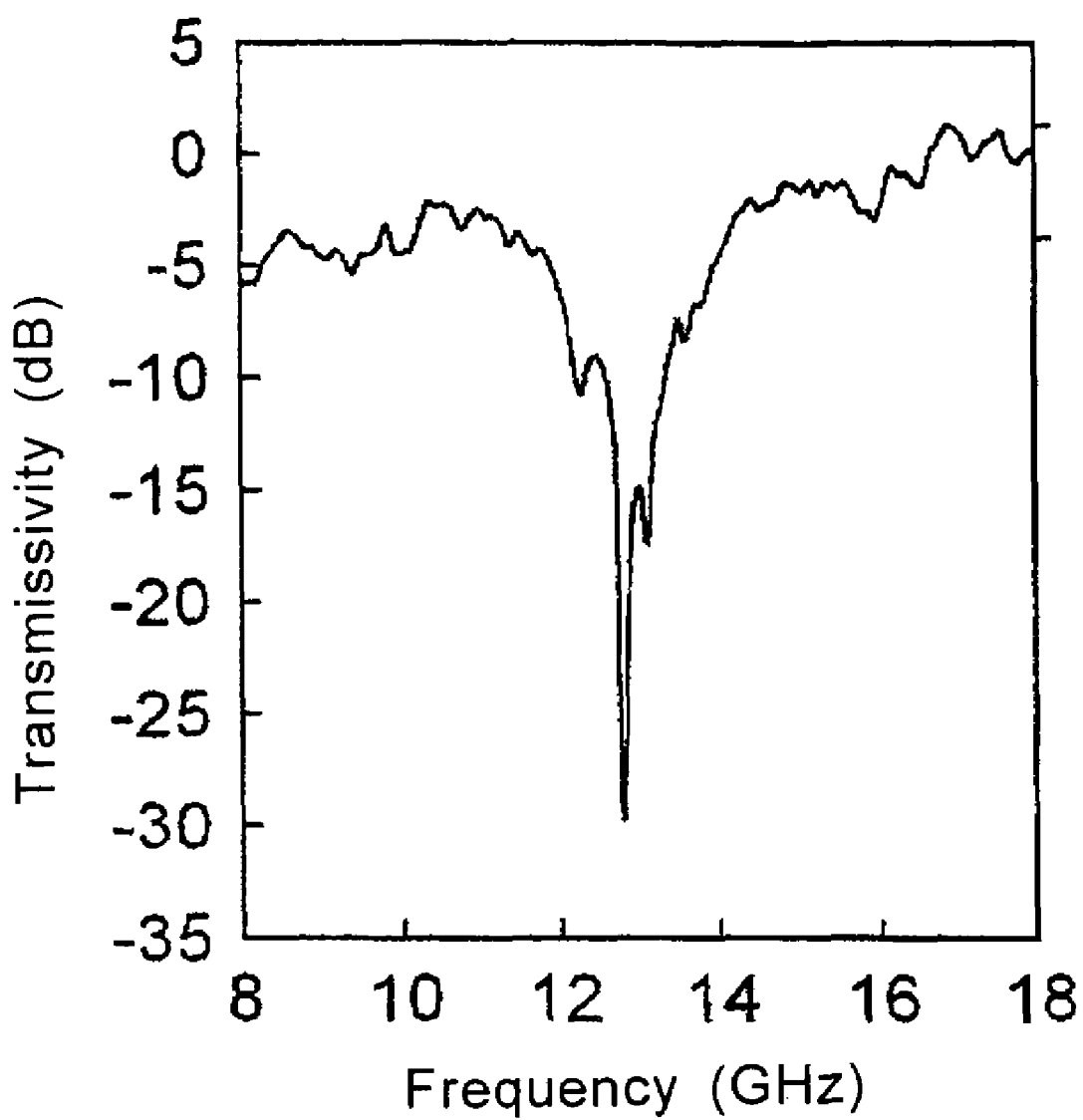
FIG. 6B is a transmission spectrum of the Menger sponge-type fractal-structure body of FIG. 1 for electromagnetic waves.

FIG. 6A and FIG. 6B show the spectrum of reflection by the sample and spectrum of transmission through the sample, respectively. The reflection loss at 12.7 GHz is about 4 dB and the transmission loss at the same frequency is about 25 dB. This means that electromagnetic wave of 12.7 GHz incident on the sample is hardly reflected or transmitted. The sample used in this measurement has the structure shown in FIG. 1 and measures 27 mm along one edge of the cube 1 and 9 mm, 3 mm and 1 mm, respectively, along one edge of the cavities of a square prism shape 12, 13 and 14.

Figure 7:
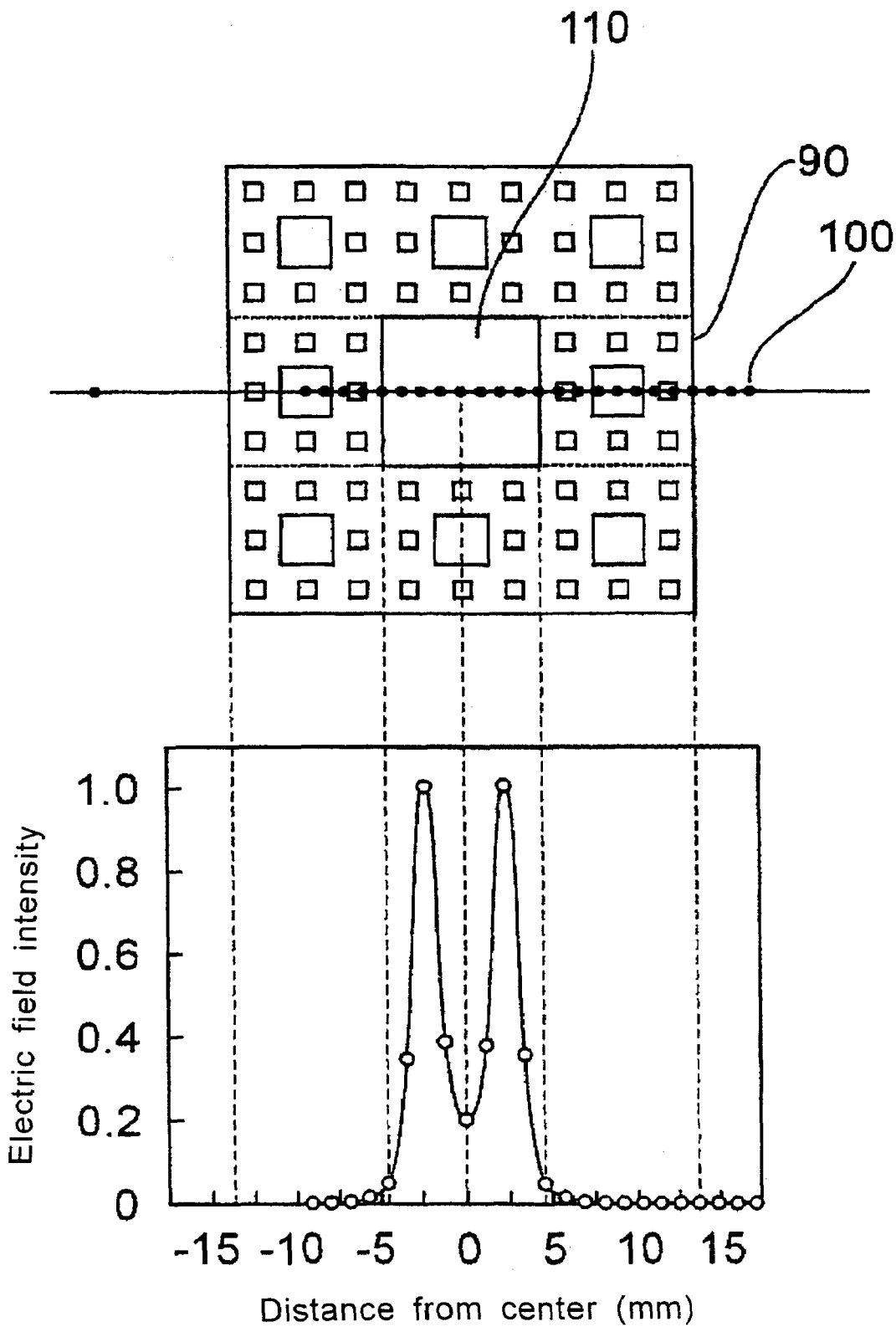
FIG. 7 shows an electric field intensity distribution measured in the cavity located at the center of the Menger sponge-type fractal-structure body shown in FIG. 1.

FIG. 7 shows an electric field distribution measured at positions 100 in the cavity, with the antenna 70 inserted along direction X into the central cavity 90 of the sample.

The spectrum shows two peaks of electric field intensity in the cavity, while the intensity rapidly falls with the distance from the central cavity. A similar electric field intensity distribution was observed also in a diagonal direction within the plane of the central cavity and in a diagonal direction within the cube. Such a concentration of electric field in the central cavity indicates the occurrence of confinement of electromagnetic wave.

The localized electromagnetic waves of 12.7 GHz had a wavelength of 23.4 mm. This wavelength equals the wavelength predicted from the formula $2a\sqrt{\in} \times n/S$ (a is the length of one edge of the cubic Menger sponge-type fractal structure, $\in$ is mean volume dielectric constant, n is 1 and S is 3). This means that the wavelength, and so the frequency, of the electromagnetic wave that is localized can be set by design. The Menger sponge of stage 3 formed from the epoxy resin (dielectric constant 2.8) had a mean volume dielectric constant of 1.74.

Figure 8:
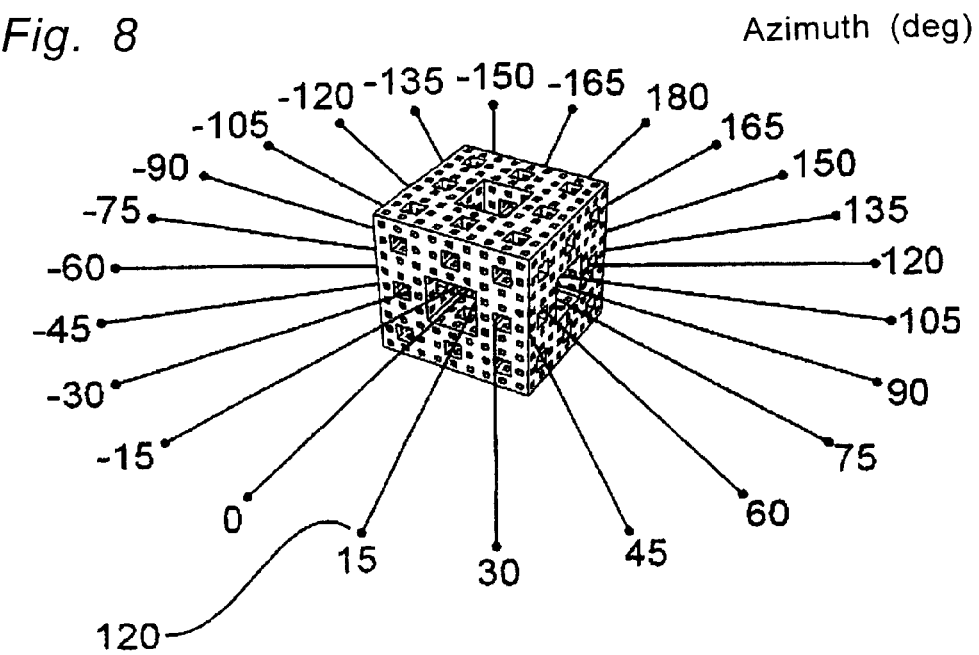
FIG. 8 shows the directions where probes were placed around a fractal-structure body to measure electromagnetic waves of 12.7 GHz emitted in the cavity located at the center of the Menger sponge-type fractal-structure body shown in FIG. 1.

FIG. 8 shows the directions where the antennas 70 were placed around the sample to measure the electromagnetic waves of 12.7 GHz emitted from the antenna 60 located at the center of the cavity 110. Great attenuation of about −25 dB was observed in any of the directions shown in the diagram. This result means that the electromagnetic wave was confined and hardly leaked outside of the sample.

Example 2

In Example 2, an antenna having fractal structure was made and evaluated by making use of the fact that a fractal-structure body (Menger sponge-type fractal-structure body) can strongly concentrate electromagnetic waves incident from any direction into the central cavity.

That is, the Menger sponge-type fractal-structure body was used as an antenna head in Example 2.

Figure 9:
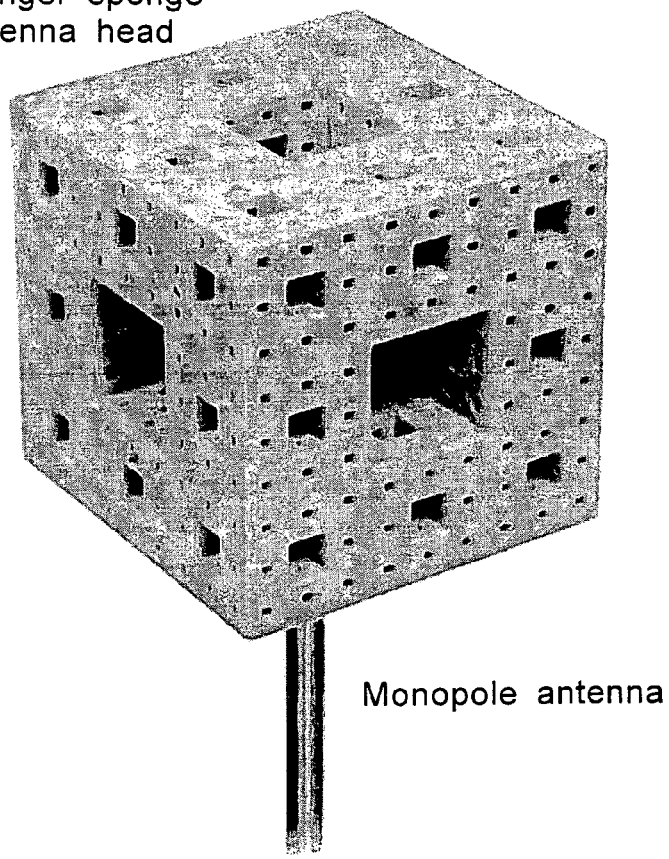
FIG. 9 is a perspective view of a fractal antenna made of the Menger sponge-type fractal-structure body of the present invention.
Figure 10:
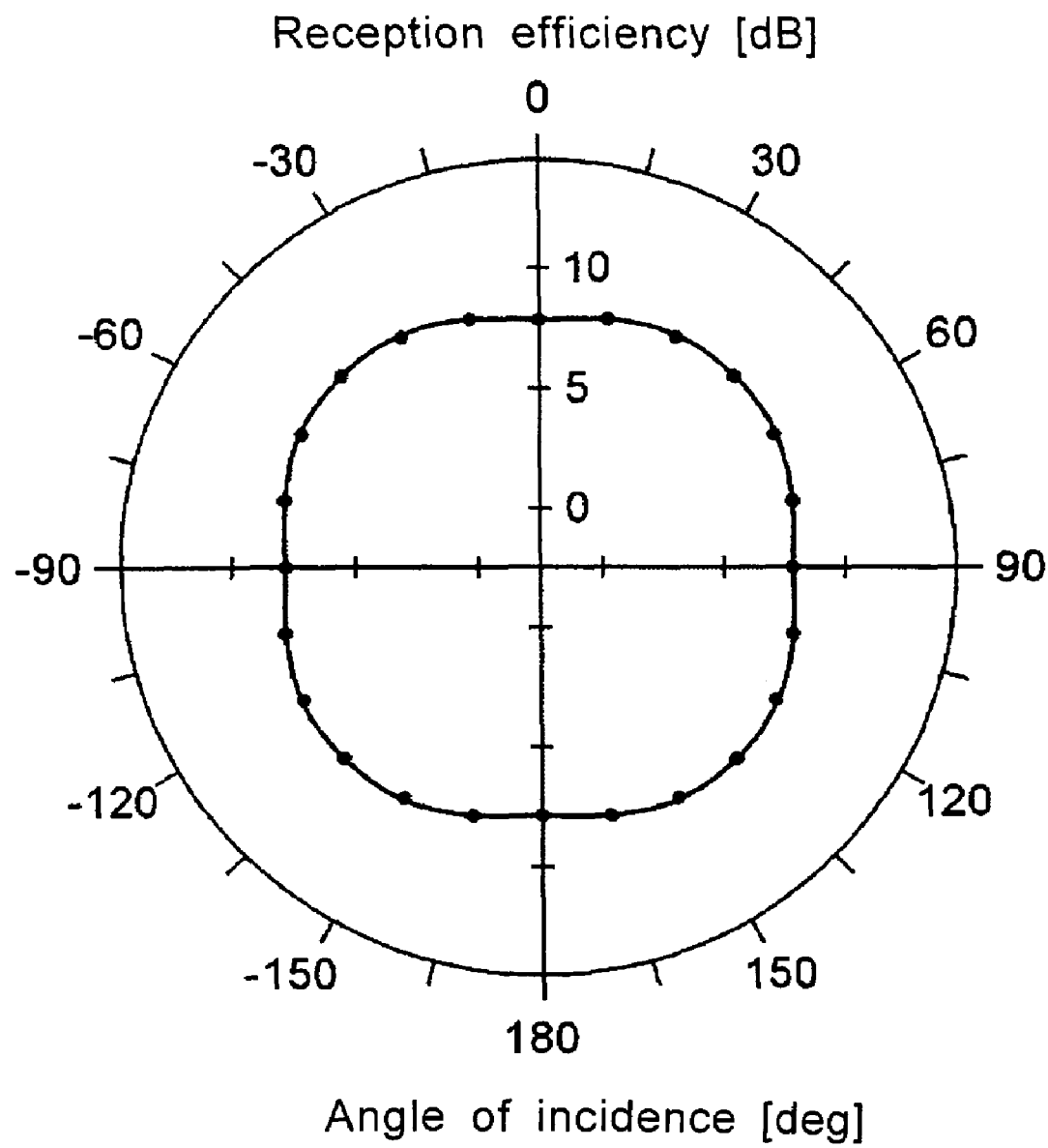
FIG. 10 shows the directivity of reception of the fractal antenna shown in FIG. 9.

Specifically, the Menger sponge-type fractal-structure body (shown in FIG. 1) of stage 3 of a 27 mm cube was formed from an epoxy resin containing titania-silica particles dispersed therein, and was mounted on a monopole antenna for microwave emission. A prototype of the fractal antenna thus constituted is shown in perspective in FIG. 9. The tip of the antenna was located at a point where the electric field intensity showed a maximum value. An electromagnetic wave of 8 GHz, which was the localizing frequency of the Menger sponge-type fractal-structure body, was emitted from a microwave horn antenna toward the fractal antenna described above and was received thereby. By moving the emitting antenna around the receiving antenna at the center, the efficiency of the antenna having a fractal structure to receive electromagnetic waves incident in various directions was evaluated. With the transmissivity of electromagnetic waves in a space without the antenna head (Menger sponge-type fractal-structure body) mounted being defined as 0 dB, the characteristics of the antenna were evaluated by the improvement in the receiving efficiency. The receiving characteristics of the fractal antenna evaluated in this way are shown in FIG. 10. As will be seen from FIG. 10, the efficiency of receiving electromagnetic waves incident in every direction showed improvement of 10 dB at the maximum. That is, an improvement in the receiving efficiency as much as almost 1000% was achieved. This fractal antenna has such an advantage over a conventional parabola antenna, patch antenna, and the like, in the capability to receive signals from all directions.

Example 3

In Example 3, a fractal-structure body made of ceramics was made and evaluated.

In this example, the fractal-structure body made of ceramics shown in FIG. 1 was fabricated as follows.

A green compact of the Menger sponge-type fractal-structure body of stage 3 of a 27 mm cube was formed by stereolithography from a photocurable resin including titania-silica dielectric ceramics dispersed therein.

Figure 11:
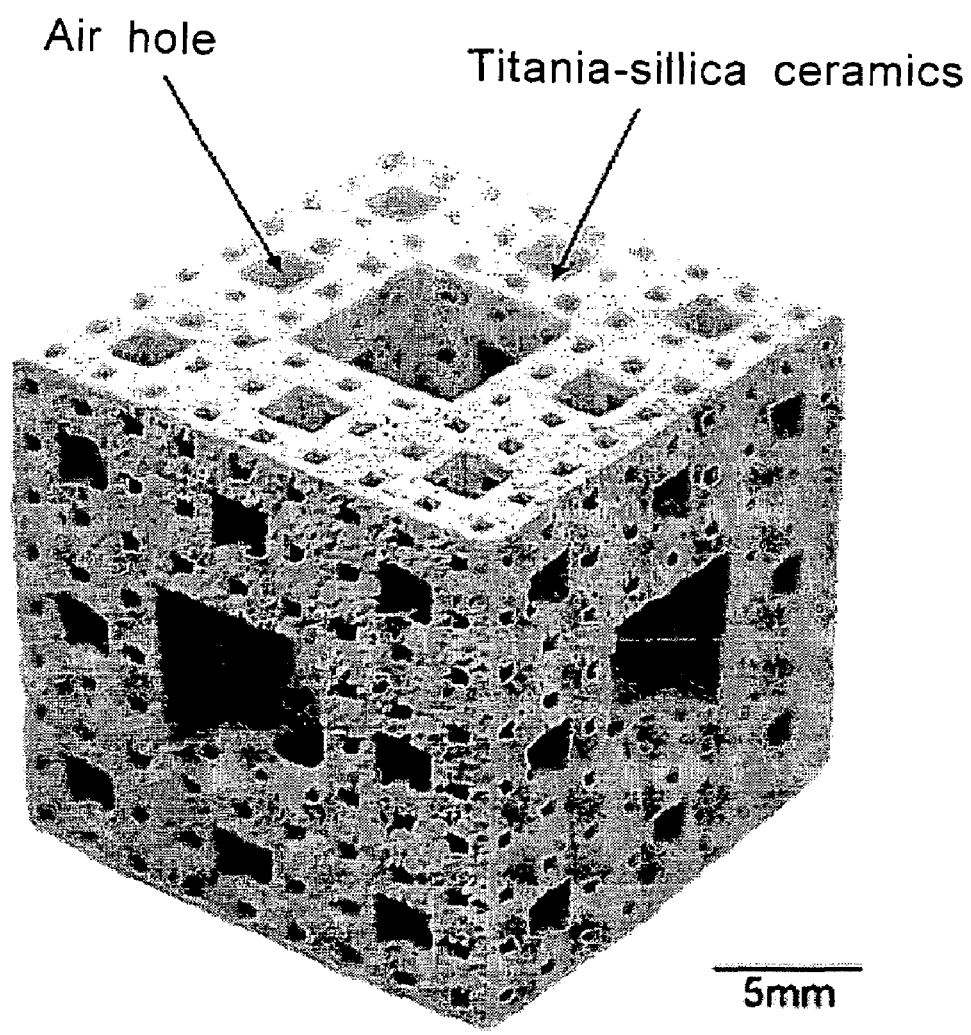
FIG. 11 is a photograph of a fractal-structure body made of ceramics according to the present invention.

The green compact was heated in air so as to gasify the resin component and was heated at 1450° C. for 2 hours so as to sinter the ceramics. A photograph of the sintered body in perspective is shown in FIG. 11.

Figure 12:
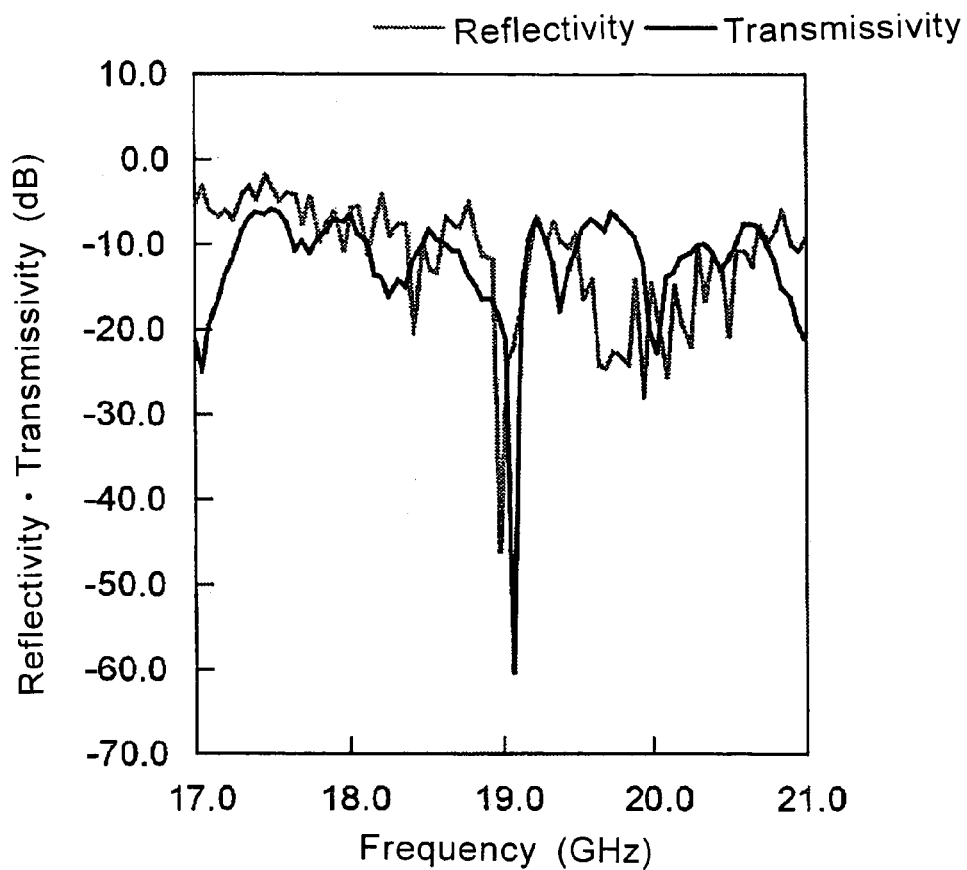
FIG. 12 shows reflection and transmission spectra of the fractal-structure body made of ceramics of FIG. 11 for electromagnetic waves.

The sintered body has a fractal-structure body of a cubic shape measuring 12 mm along one edge, and is penetrated by holes having cross sections of 4 mm square, 1.3 mm square and 0.4 mm square. While the sintered fractal-structure body showed a low density, the density can be increased by increasing the quantity of the ceramic particles dispersed in the photocurable resin. The particles of silica-titania composite ceramics have a dielectric constant of 15. The dielectric constant of the material that constitutes the fractal-structure body made of ceramics calculated by taking the void ratio into consideration was 7.3. The evaluation of the electromagnetic characteristics of the fractal-structure body made of ceramics by using a metal waveguide showed the existence of a localization mode at 19.1 GHz as shown in FIG. 12. The result of this experiment shows the validity of the theoretical formulae described so far.

While the peak frequency of reflectivity and the peak frequency of transmissivity do not agree as shown in FIG. 12, it is supposedly because there occurred variations in the dimensions of the square holes of the fractal-structure body due to the strain generated in the structure during the sintering process. According to the present invention, these peaks are not required to agree.

Example 4

In Example 4, the fractal-structure bodies shown in FIGS. 13A, 13B, 13C, 13D, 13E related to Example 2 were made and evaluated.

FIGS. 14A, 14B, 14C, 14D, 14E show reflection and transmission spectra of the structures shown in FIGS. 13A, 13B, 13C, 13D, 13E, respectively, for electromagnetic waves incident thereon. These fractal structure bodies were made of an epoxy resin having 10% by volume of a $TiO_2$—$SiO_2$ compound powder dispersed therein.

(Method to Measure Electromagnetic Wave Characteristics)

Electromagnetic wave characteristics of the fractal-structure bodies shown in FIGS. 13A, 13C, 13E were measured by the method shown in FIG. 5.

Figure 15:
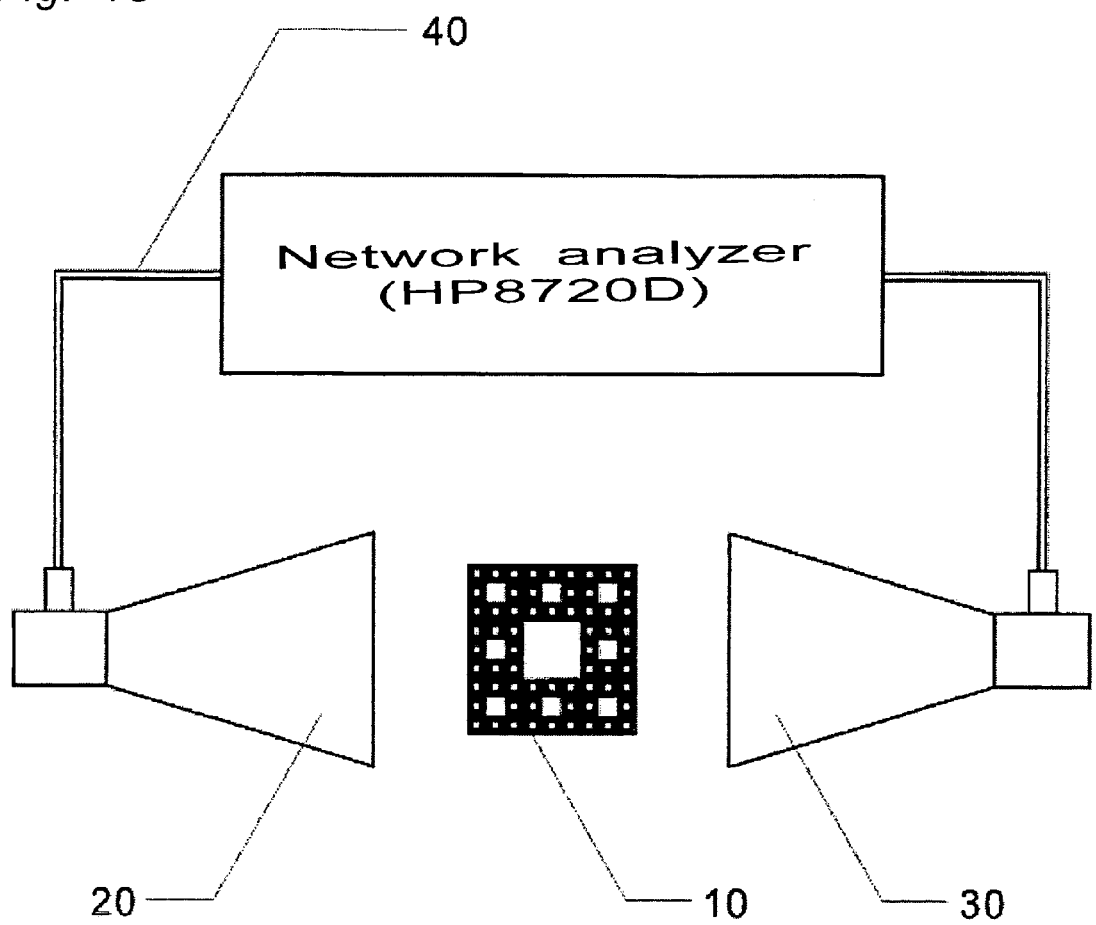
FIG. 15 is a schematic diagram depicting the setup for measuring reflection and transmission of electromagnetic waves using horn antennas.

Electromagnetic wave characteristics of the fractal-structure bodies shown in FIGS. 13B and 13D were measured in free space by means of a horn antenna shown in FIG. 15.

Figure 14A:
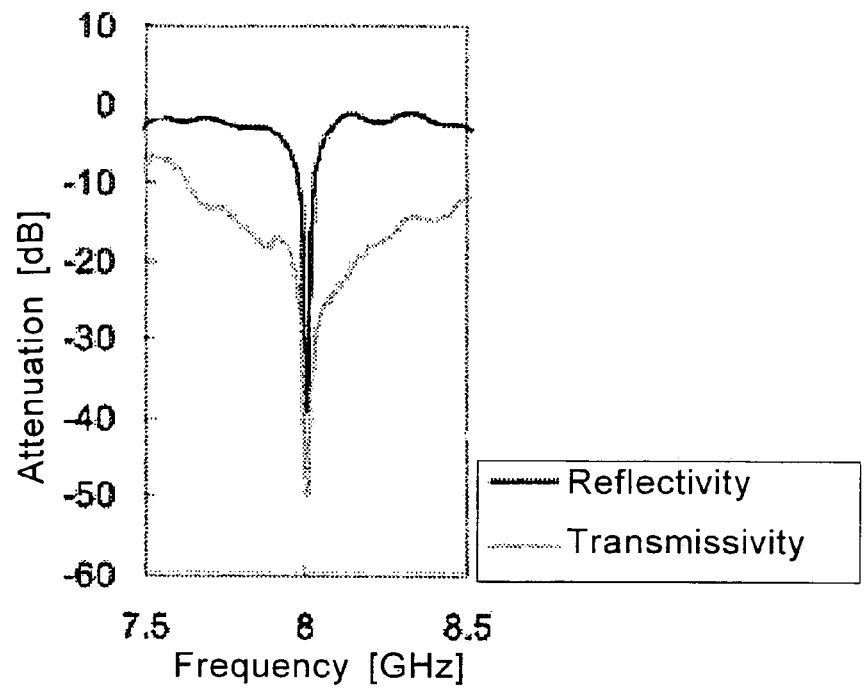
FIG. 14A shows reflection and transmission spectra of the Menger sponge-type fractal-structure body shown in FIG. 9A.

FIG. 14A shows the measurements of the Menger sponge type fractal-structure body shown in FIG. 13A. It can be seen that both the transmission loss and the reflection loss at 8 GHz are −40 dB or more, indicating that electromagnetic waves of this frequency are localized in the central cavity shown in FIG. 13A as mentioned in the first embodiment. The wavelength of the localized electromagnetic waves of approximately 8 GHz is 36.75 mm, which equals the wavelength of the primary mode predicted by the following formula.

$$2^p a \sqrt{\in_n}/S^{2p-1}$$ [Equation 26]

The sample under measurement had a size of 27 mm along one edge 'a' and a mean volume dielectric constant of 4.17. Other parameters were 1 for n, 3 for S and 1 for p.

The formula described above shows that the frequency corresponding to the wavelength of the secondary mode in this sample is 30 GHz or higher.

Figure 14B:
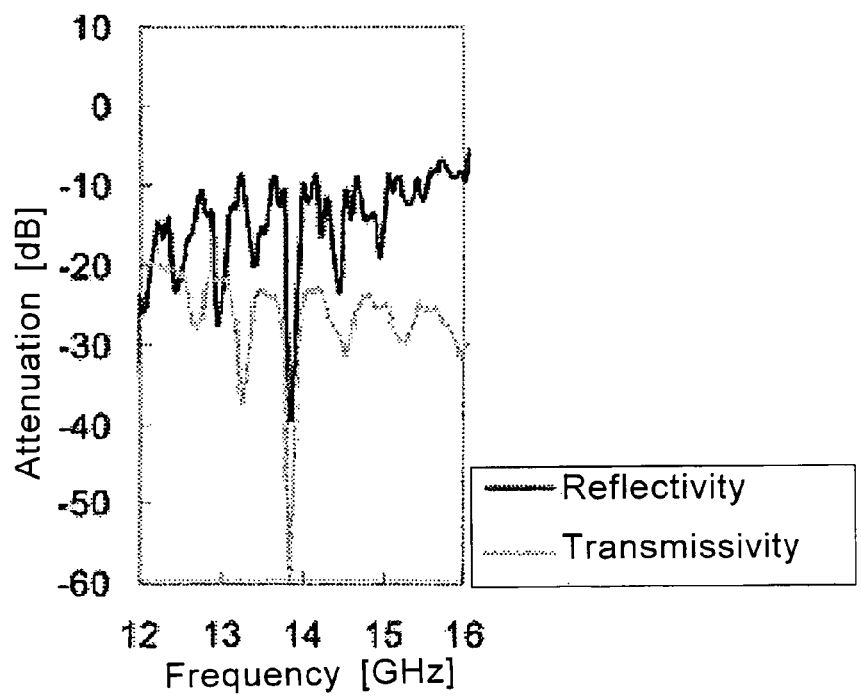
FIG. 14B shows reflection and transmission spectra of the wall-shaped super structure shown in FIG. 9B.

FIG. 14B shows the characteristics of the wall-shaped super structure of stage 4 constituted from the Menger sponge-type fractal structures shown in FIG. 13B. It can be seen that both the transmissivity and the reflectivity at 13.8 GHz decreased to −40 dB or lower, indicating that electromagnetic waves of this frequency are localized in the inner cavity. The wavelength of the localized electromagnetic wave of approximately 13.8 GHz is 21.7 mm, which equals the wavelength of the secondary mode (p=2) calculated from the following formula that applies to the Menger sponge-type fractal-structure body of stage 4.

$$2^p a \sqrt{\in_n}/S^{2p-1}$$ [Equation 27]

The sample had a size of 81 mm along one edge 'a', a mean volume dielectric constant of 3.34, n of 1 and S of 3. This means that the localization frequency of the fractal-structure body shown in FIG. 13B can also be designed.

Figure 14C:
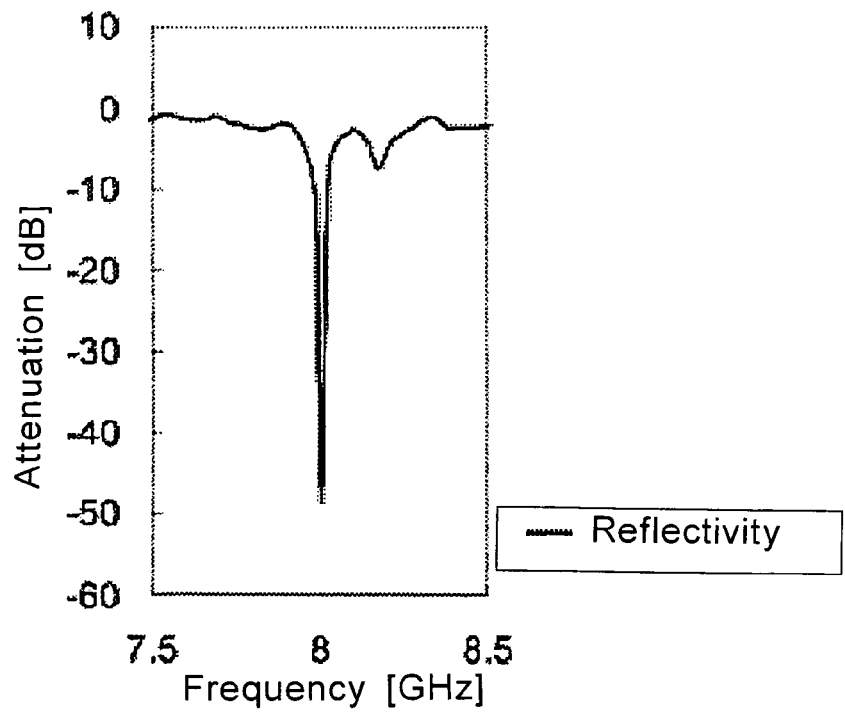
FIG. 14C shows the reflection spectrum of the partial wall-shaped structure shown in FIG. 9C.

FIG. 14C shows the results of measuring the thin wall-shaped super structure shown in FIG. 13C. It can be seen that only the reflectivity at 8 GHz decreased to −30 dB, and the wavelength equals the wavelength of the electromagnetic wave localized in the Menger sponge-type fractal-structure body of stage 3 shown in FIG. 13A.

Figure 14D:
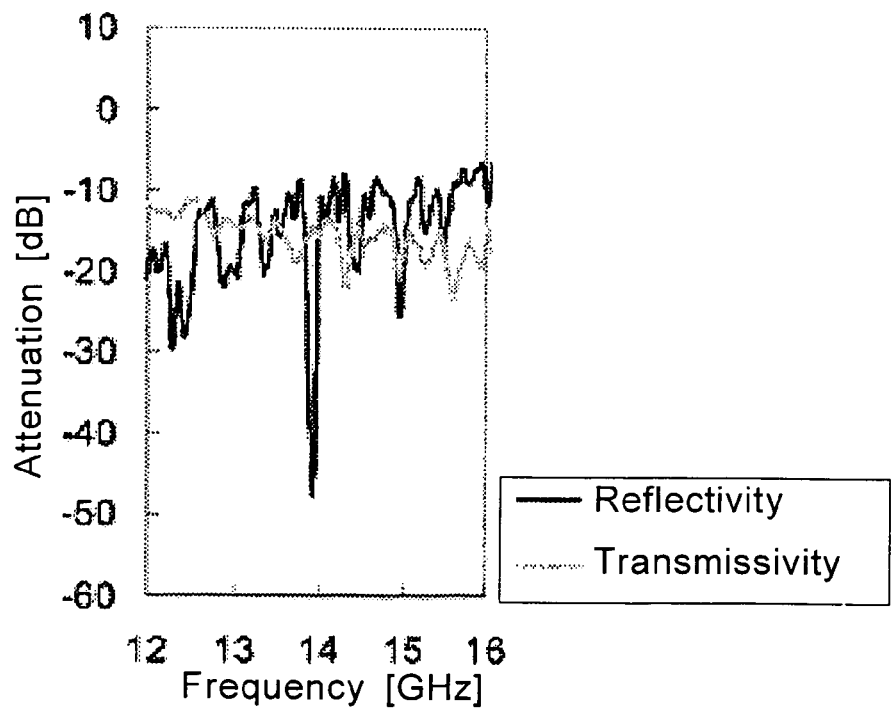
FIG. 14D shows reflection and transmission spectra of the thin wall-shaped super structure shown in FIG. 9D.

FIG. 14D shows the results of measuring the thin wall-shaped super structure shown in FIG. 13D. It can be seen that only the reflectivity at 13.8 GHz decreased to −40 dB or less, and the wavelength equals the wavelength of the electromagnetic wave localized in the super structure of the Menger sponge-type fractal-structure of stage 4 shown in FIG. 13B.

Figure 14E:
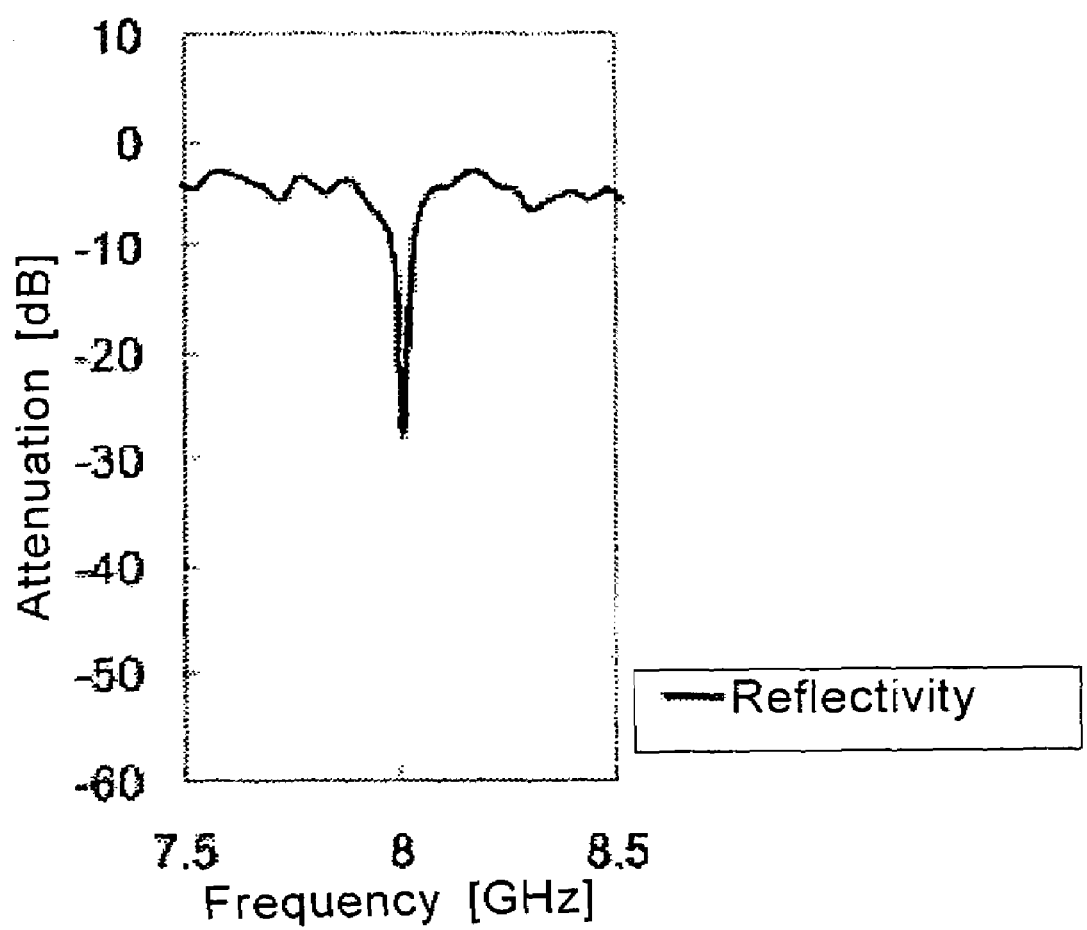
FIG. 14E shows the reflection spectrum of the plate-shaped structure shown in FIG. 9E.

FIG. 14E shows the results of measuring the plate-shaped structure shown in FIG. 13E. It can be seen that only the reflectivity at 8 GHz decreased to −30 dB, and the wavelength at this time equals the wavelength of the electromagnetic wave localized in the Menger sponge-type fractal-structure body of stage 3 shown in FIG. 13A.

With regards to the cavity-penetrated plate-shaped super structure similar to that shown in FIG. 13B where regions of size ⅓ of one edge 'a' are shared in the vertical and horizontal faces in the cavity-penetrated plate-shaped super structure, shown in FIG. 13E, it can be easily expected that only the reflectivity at 13.8 GHz would decrease greatly, similar to the case of FIG. 13D.

The reason why a minimum was observed in the reflectivity and/or the transmissivity at a primary mode frequency of 8 GHz in samples shown in FIGS. 13A, 13C, 13E and a minimum was observed in the reflectivity and/or the transmissivity at a secondary mode frequency of 13.4 GHz in the samples shown in FIGS. 13B and 13D is that the secondary mode frequency in the former samples shifts to a higher frequency and the primary mode frequency in the latter samples shifts to a lower frequency, both deviating out of the measurable frequency range of the presently available measuring instruments, and the frequencies of the higher modes might be measured for any samples if a wider measurable frequency range becomes possible.

As described above, for various Menger sponge-type fractal structures and super structures thereof shown in FIGS. 13A through 13E, the wavelength or frequency at which the reflectivity and transmissivity for the electromagnetic waves sharply drop can be determined from the stage number of the Menger sponge-type fractal structure, the mean volume dielectric constant, the length of one edge a, the number of divisions of each edge, the order of the localized mode and other parameters.

The fractal-structure body according to the present invention can be used as a filter or a no-reflection plate that completely shuts off electromagnetic waves of a particular wavelength. The fractal-structure body and a super structure thereof provided with a nonlinear optical crystal, such as ZnTe or LiNbO$_3$, or a nonlinear optical element that is a photoconductivity antenna made of GaAs, or the like, inserted therein may be used as an oscillator that efficiently generates harmonics of a particular wavelength through enhancement of the nonlinear optical effect and generates a high energy beam. A fractal-structure body and a super structure thereof formed from solely from a metal, a dielectric material coated with a metal, or a composite material of metal and dielectric material so as to have electric conductivity on the surface or throughout the volume thereof may be used as an apparatus that localizes electromagnetic waves of a particular wavelength and converts the localized electromagnetic energy into an electric current. When electromagnetic waves of a particular wavelength are localized in the fractal-structure body and a super structure thereof and are absorbed in a metal, the fractal structure can be used as a heat source.

The invention claimed is:

1. A fractal structure body comprising:
a three-dimensional fractal structure, partially or totally, the three-dimensional fractal structure including:
a plurality of faces forming a plurality of pairs of parallel faces;
a plurality of through-holes, one or more through-holes of the plurality of through-holes penetrating each face of the plurality of faces; and
a plurality of primary structures each having a shape of a 1/S reduction of the three-dimensional fractal structure including the plurality of through-holes, S being an integer representing a ratio of a size of the three-dimensional fractal structure to a size of a primary structure of the plurality of primary structures,
wherein an intersection of the plurality of through-holes with a face of the plurality of faces is an n/S reduction of the face, n being an integer greater than or equal to one and less than S, and
wherein a stage number m of the three-dimensional fractal structure is greater than or equal to three, the stage number m being a level of hierarchy to which the fractal structure is repeated in a nested structure,
wherein the fractal structure body has a local minimum value of at least one of a transmissivity for electromagnetic waves and a reflectivity for electromagnetic waves at a particular wavelength determined by structural factors and material factors of the three-dimensional fractal structure,
wherein the structural factors include the stage number m, and
wherein the particular wavelength is defined by an equation $2*a_m*(\sqrt{\in_m})*n/S$, where $a_m$ is a length of a side of a structure pattern and $\in_m$ is a mean volume dielectric constant.

2. The fractal structure body according to claim 1, wherein the local minimum value of transmissivity is −10 dB or less.

3. The fractal structure body according to claim 1, wherein the local minimum value of reflectivity is −5 dB or less.

4. The fractal structure body according to claim 1, wherein the fractal structure body localizes an electromagnetic wave of the particular wavelength within the three-dimensional fractal structure.

5. The fractal structure body according to claim 1, wherein a fractal dimension D determined by an equation $N=S^D$, where N is a number of divisions of the fractal structure body into identical elements minus a number of elements removed from the fractal structure body to form the plurality of through-holes, is a non-integral number which is larger than 2.

6. The fractal structure body according to claim 5, wherein the fractal structure body comprises a constitution such that a fundamental structure pattern is repeated in different scales in a nested structure.

7. The fractal structure body according to claim 5, wherein the fractal structure body comprises a Menger sponge-type fractal structure in which the fractal dimension D is 2.7268.

8. The fractal structure body according to claim 1, wherein the mean volume dielectric constant $\in_m$ is determined from the structural factors of the three-dimensional fractal structure and a dielectric constant of the three-dimensional fractal structure.

9. The fractal structure body according to claim 1, wherein the fractal structure body is made of a material selected from a group consisting of resin, ceramics, semiconductors, metals, and composite materials thereof.

10. The fractal structure body according to claim 9, wherein the fractal structure body is made of a resin that includes at least one of ceramic particles of high dielectric constant and ceramic particles of low electromagnetic loss dispersed uniformly therein.

11. The fractal structure body according to claim 9, wherein at least one of an inner surface and an external surface of the fractal structure body is coated with a material selected from a group consisting of ceramics, semiconductors, and metals, on a part or a whole thereof.

12. A filter for eliminating or passing an electromagnetic wave of the particular wavelength,
wherein the filter comprises the fractal structure body according to claim 1.

13. An electromagnetic wave circuit comprising:
a photonic crystal for reflecting the electromagnetic waves of the particular wavelength provided with a waveguide for the electromagnetic waves; and
the fractal structure body according to claim 1, embedded in a middle of the waveguide for storing and amplifying the electromagnetic waves.

14. A fractal structure assembly which is a wall-shaped or column-shaped super structure,
the fractal structure assembly comprising:
a plurality of the fractal structure bodies according to claim 1,
wherein neighboring fractal structure bodies of the plurality of fractal structure bodies are disposed so as to share regions of ⅓ to ⅑ of one edge in length along at least one of vertical faces and horizontal faces of the neighboring fractal structure bodies.

15. A plate-shaped fractal structure body
comprising a partial structure body which is a plate-shaped portion cut from the fractal structure body according to claim 1 so as to have a thickness of ⅓ to ⅑ of a length of one edge.

16. A plate-shaped fractal structure assembly which is a wall-shaped or column-shaped super structure,
the plate-shaped fractal structure assembly comprising:
a plurality of partial structure bodies each partial structure body of the plurality of partial structure bodies being a plate-shaped portion cut from the fractal structure body according to claim 1 so as to have a thickness of ⅓ to ⅑ of a length of one edge, wherein neighboring partial structure bodies of the plurality of partial structure bodies are connected so as to share regions of 1/3 to 1/9 of the length of one edge along at least one of vertical faces and horizontal faces of the neighboring partial structure bodies.

17. A fractal structure body comprising:

a three-dimensional fractal structure, partially or totally, the three-dimensional fractal structure including:

a plurality of pairs of parallel faces;

a plurality of through-holes, one or more through-holes of the plurality of through-holes penetrating each face of the plurality of faces; and a plurality of primary structures each having a shape of a 1/S reduction of the three-dimensional fractal structure including the plurality of through-holes, S being an integer representing a ratio of a size of the three-dimensional fractal structure to a size of a primary structure of the plurality of primary structures, wherein an intersection of the plurality of through-holes with a face of the plurality of faces is an n/S reduction of the face, n being an integer greater than or equal to one and less than S, and wherein a stage number m of the three-dimensional fractal structure is greater than or equal to three, the stage number m being a level of hierarchy to which the fractal structure is repeated in a nested structure, wherein the fractal structure body is for localizing an electromagnetic wave of a particular wavelength within the fractal structure body, the particular wavelength being determined by structural factors which define the three-dimensional fractal structure and at least one of a dielectric constant and an electric conductivity of a material that forms the fractal structure body, wherein the structural factors include the stage number m, and wherein the particular wavelength is defined by an equation $2*a_m*(\sqrt{\in_m})*n/S$, where $a_m$ is a length of a side of a structure pattern and $\in_m$ is a mean volume dielectric constant.

18. The fractal structure body according to claim 17, wherein a fractal dimension D determined by an equation $N=S^D$, where N is a number of divisions of the structure body into identical elements minus a number of elements removed from the three-dimensional fractal structure to form the plurality of through-holes, is a non-integral number which is larger than 2.

19. The fractal structure body according to claim 18, wherein the fractal structure body comprises a constitution such that a fundamental structure pattern is repeated in different scales in a nested structure.

20. The fractal structure body according to claim 18, wherein the fractal structure body comprises a Menger sponge-type fractal structure in which the fractal dimension D is 2.7268.

21. The fractal structure body according to claim 17, wherein the mean volume dielectric constant $\in_m$ is determined from the structural factors of the three-dimensional fractal structure and a dielectric constant of the three-dimensional fractal structure.

22. The fractal structure body according to claim 17, wherein the fractal structure body is made of a material selected from a group consisting of resins, ceramics, semiconductors, metals, and composite materials thereof.

23. The fractal structure body according to claim 22, wherein the fractal structure body is made of a resin that includes at least one of ceramic particles of high dielectric constant and ceramic particles of low electromagnetic loss dispersed uniformly therein.

24. The fractal structure body according to claim 22, wherein at least one of an inner surface and an external surface of the fractal structure body is coated with a material selected from a group consisting of ceramics, semiconductors, and metals, metal on a part or a whole thereof.

25. A filter for eliminating or passing the electromagnetic wave of the particular wavelength, the filter comprising the fractal structure body according to claim 17.

* * * * *